(12) United States Patent
Takubo

(10) Patent No.: US 7,661,264 B2
(45) Date of Patent: Feb. 16, 2010

(54) AIR-FUEL RATIO CONTROL APPARATUS FOR INTERNAL COMBUSTION ENGINE

(75) Inventor: Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 358 days.

(21) Appl. No.: 11/841,045

(22) Filed: Aug. 20, 2007

(65) Prior Publication Data

US 2008/0257325 A1    Oct. 23, 2008

(30) Foreign Application Priority Data

Apr. 20, 2007    (JP)    ............. 2007-111987

(51) Int. Cl.
*F01N 3/00*    (2006.01)
(52) U.S. Cl. .............. 60/285; 60/276; 60/277; 60/286; 60/295; 123/198 F; 123/481; 701/103; 701/109
(58) Field of Classification Search ............ 60/274, 60/276, 277, 285, 286, 295, 297; 701/103, 701/104, 109
See application file for complete search history.

(56) References Cited

U.S. PATENT DOCUMENTS 6,405,527 B2 * 6/2002 Suzuki et al. ............ 60/285
6,874,313 B2 * 4/2005 Yurgil et al. ............ 60/277
6,892,527 B2 * 5/2005 Ueda et al. ............ 60/277
6,901,741 B2 * 6/2005 Kobayashi et al. ........ 60/274
7,188,468 B2 * 3/2007 Fukusako et al. ......... 60/285
7,469,530 B2 * 12/2008 Fujiwara et al. .......... 60/285

FOREIGN PATENT DOCUMENTS

| JP | 63-195351 A | 8/1988 |
| JP | 2-33408 A | 2/1990 |
| JP | 2-136538 A | 5/1990 |
| JP | 6-42387 A | 2/1994 |

* cited by examiner

*Primary Examiner*—Tu M Nguyen
(74) *Attorney, Agent, or Firm*—Sughrue Mion, PLLC

(57) ABSTRACT

An air-fuel ratio control apparatus for an internal combustion engine, including fuel cut state detection means for detecting the state of fuel cut in which the feed of fuel into the internal combustion engine is stopped, and catalyst deterioration decision means for deciding the deterioration of a catalyst on the basis of a period which is expended since the detection of the release of the state of the fuel cut by the fuel cut state detection means, until the output value of a second air-fuel ratio sensor agrees with a predetermined reset decision value near a target value, and the manipulation quantity of an average air-fuel ratio on the upstream side of the catalyst as is based on second air-fuel ratio feedback control means. Thus, the deterioration of the catalyst can be decided at a high precision.

13 Claims, 18 Drawing Sheets

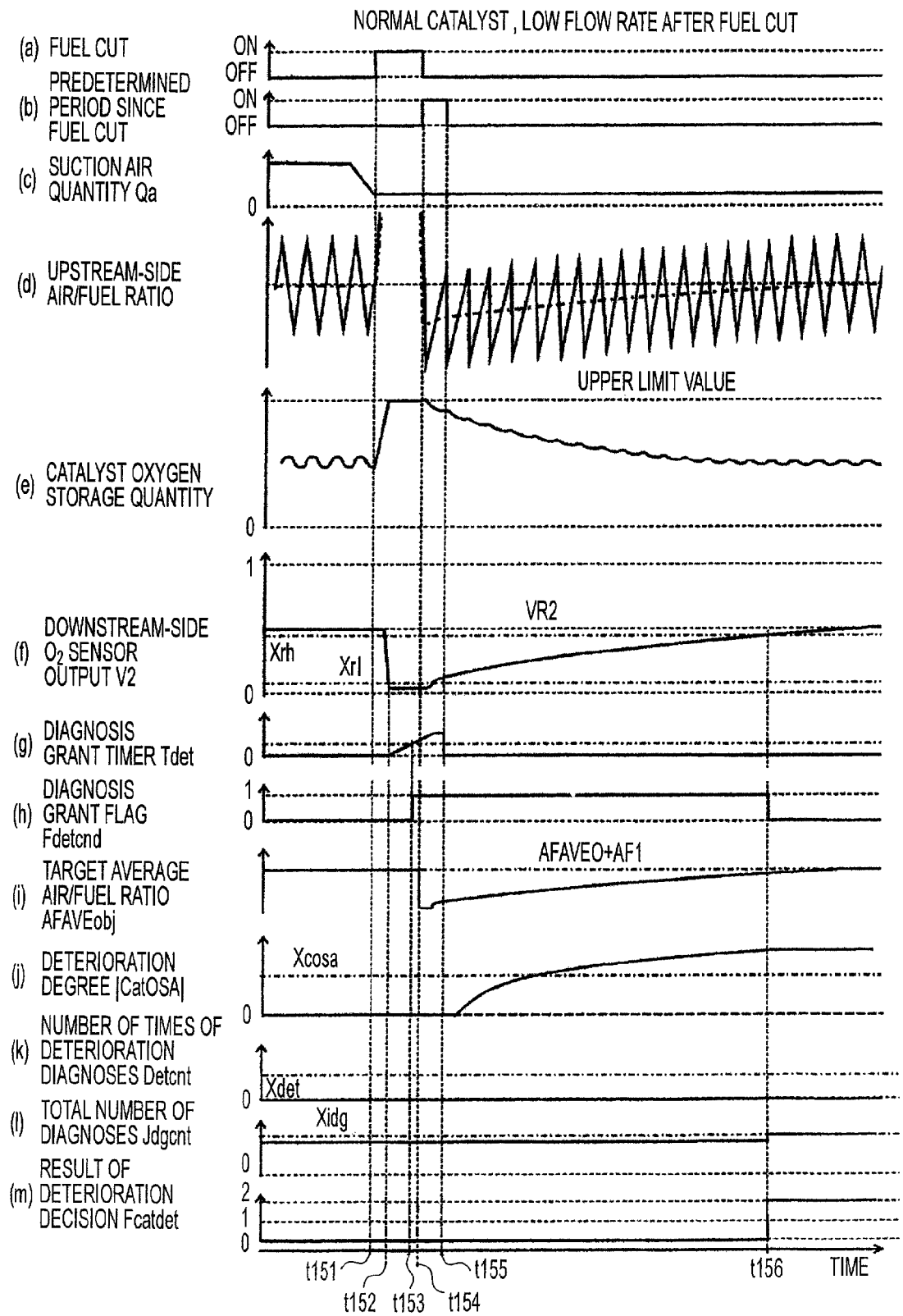

AIR-FUEL RATIO CONTROL APPARATUS FOR INTERNAL COMBUSTION ENGINE

BACKGROUND OF THE INVENTION

1. Field of the Invention

This invention relates to an air-fuel ratio control apparatus for an internal combustion engine.

2. Description of the Related Art

In general, a catalyst converter including a ternary catalyst which simultaneously purifies HC, CO and $NO_x$ in exhaust gas is disposed in the exhaust passage of an internal combustion engine. With the catalyst in the catalyst converter, purification rates heighten for all of the components HC, CO and $NO_x$ near a theoretical air-fuel ratio. Usually, therefore, an $O_2$ sensor is disposed on the upstream side of the catalyst, and an air-fuel ratio is controlled on the basis of the detection value of the upstream-side $O_2$ sensor so as to become near the theoretical air-fuel ratio.

The upstream-side $O_2$ sensor which is disposed on the upstream side of the catalyst is located in that place of an exhaust system which is as close to the combustion chamber of the internal combustion engine as possible, that is, at the aggregate part of an exhaust manifold in the upstream of the catalyst. Accordingly, the upstream-side $O_2$ sensor is exposed to a high exhaust temperature and is poisoned with various harmful substances, so that the output characteristic thereof fluctuates greatly. In order to compensate the fluctuation of the output characteristic, therefore, a double $O_2$ sensor system has already been proposed. In the system, a downstream-side $O_2$ sensor is disposed on the downstream side of the catalyst, and a second air-fuel ratio feedback control based on the downstream-side $O_2$ sensor is performed in addition to a first air-fuel ratio feedback control based on the upstream-side $O_2$ sensor (refer to, for example, Patent Document 1 being JP-A-63-195351, and Patent Document 2 being JP-A-6-42387).

In such a prior-art air-fuel ratio control apparatus for the internal combustion engine, the downstream-side $O_2$ sensor is lower in response rate than the upstream-side $O_2$ sensor, but it has merits as stated below. The downstream-side $O_2$ sensor is little influenced by heat because an exhaust temperature is low on the downstream side of the catalyst, and it is little poisoned because the various harmful substances have been trapped by the catalyst, so that the fluctuation of the output characteristic of the downstream-side $O_2$ sensor is small. Further, since the exhaust gas is mixed more on the downstream side of the catalyst, the purification state of the catalyst located upstream of the downstream-side $O_2$ sensor can be detected stably.

Besides, in accordance with the prior-art air-fuel ratio control apparatus for the internal combustion engine as employs the double $O_2$ sensor system, the air-fuel ratio of the upstream side with respect to the catalyst is corrected, and the output of the downstream-side $O_2$ sensor is maintained at a target value, whereby the fluctuation of the output characteristic of the upstream-side $O_2$ sensor can be compensated, and the purification state of the catalyst can be held favorable.

Further, the catalyst is endowed with an oxygen storage capability in order to absorb the temporary fluctuation of the upstream-side air-fuel ratio from the theoretical air-fuel ratio. That is, in a case where the air-fuel ratio is on a lean side with respect to the theoretical air-fuel ratio, the catalyst accepts and accumulates oxygen contained in the exhaust gas, and in a case where the air-fuel ratio is on a rich side, the catalyst emits the oxygen accumulated therein. In this manner, the catalyst acts like a filter or means for averaging the air-fuel ratio, and the fluctuation of the air-fuel ratio on the upstream side is averaged within the catalyst and becomes the air-fuel ratio of the downstream side of the catalyst.

Besides, the upper limit value of an oxygen storage quantity is determined by the quantity of a substance which has the oxygen storage capability and which is added at the manufacture of the catalyst. Accordingly, when the oxygen storage quantity has reached its upper limit value or its lower limit value "0", the catalyst can no longer absorb the fluctuation of the upstream-side air-fuel ratio, the air-fuel ratio within the catalyst deviates from the theoretical air-fuel ratio, and the purification capability of the catalyst degrades. On this occasion, the air-fuel ratio of the downstream side deviates greatly from the theoretical air-fuel ratio, and hence, the saturation of the oxygen storage quantity to the upper limit value or the lower limit value "0" can be detected.

The purification rates of the catalyst for all the components HC, CO and $NO_x$ in the exhaust gas become high near the theoretical air-fuel ratio, and they become the highest in a case where the oxygen storage quantity of the catalyst is about half of the upper limit value thereof. Besides, the catalyst oxygen storage quantity intermediate between the upper limit value and the lower limit value can be detected on the basis of the minute change thereof near the theoretical air-fuel ratio of the air-fuel ratio on the downstream side. Therefore, the purification rates of the catalyst can be kept high in such a way that the oxygen storage quantity is controlled to about the half of the upper limit value by controlling the output of the downstream-side $O_2$ sensor to the target value.

In general, during fuel cut for which fuel feed into the internal combustion engine is stopped, the air-fuel ratio of the upstream side becomes sharply lean. Accordingly, the oxygen storage quantity of the catalyst increases rapidly and arrives at the upper limit value, and the purification characteristic of the catalyst worsens drastically. Therefore, the purification characteristic of the catalyst needs to be recovered in such a way that, after the restart of the fuel feed, the oxygen storage quantity of the catalyst is reset to the appropriate quantity being about the half of the upper limit value, as quickly as possible.

Besides, since the catalyst in the catalyst converter is exposed under the exhaust gas temperature of the high temperature, it is designed so that its function may not abruptly degrade under service conditions which are usually considered for a vehicle. However, in a case where the exhaust gas temperature has become abnormally high for any cause, for example, misfire during the running of the internal combustion engine, the upper limit value of the oxygen storage quantity of the catalyst lowers conspicuously. Besides, even under the usual service conditions, when the travel distance of the vehicle reaches several tens-of-thousands kilometers, the upper limit value of the oxygen storage quantity lowers gradually due to the secular change of the catalyst. Accordingly, the lowering of the upper limit value of the oxygen storage quantity attributed to the deterioration of the catalyst correlates with the degradation of the exhaust gas purification performance of the catalyst, and the deterioration of the catalyst can be detected by detecting the lowering of the upper limit value of the oxygen storage quantity. When the deterioration of the catalyst proceeds, environmental pollution is incurred. It is therefore necessary to detect the deterioration of the catalyst exceeding an allowable range and to notify the deterioration to a user by an alarm lamp or the like, whereby the user is prompted to exchange the catalyst.

FIGS. 19A and 19B are characteristic diagrams each showing the change of the output V2 of the downstream-side $O_2$ sensor, and FIG. 19A corresponds to a case where the catalyst is normal, while FIG. 19B corresponds to a case where the catalyst has been deteriorated. In the case of the deteriorated catalyst shown in FIG. 19B, as compared with the case of the normal catalyst shown in FIG. 19A, a time period in which the output V2 of the downstream-side $O_2$ sensor is reset to the target value after the point of time t1 of the release of a fuel cut state for cutting the fuel feed becomes shorter as the upper limit value of the oxygen storage quantity of the catalyst decreases more due to the deterioration of the catalyst. The reason therefor is that the variation of oxygen storage required for being reset from the upper limit value to about the half of this upper limit value decreases with the decrease of the upper limit value of the oxygen storage quantity, so the resetting time period shortens with the same air-fuel ratio control. Therefore, an apparatus wherein the resetting time period in which the output V2 of the downstream-side $O_2$ sensor is reset to the target value since the point of time t1 of the release of the fuel cut is measured, thereby to render the deterioration decision of the catalyst, has already been proposed (refer to, for example, Patent Document 3 being JP-A-2-33408 or Patent Document 4 being JP-A-2-136538).

The prior-art apparatus disclosed in Patent Document 3 or 4 utilizes the arrival of the catalyst oxygen storage quantity at the upper limit value by the fuel cut, and it has a full set of conditions before the start of a deterioration diagnosis and need not perform any special air-fuel ratio control such as leaning the upstream-side air-fuel ratio, before the start of the diagnosis. Besides, while $NO_x$ emission is apprehended to increase in case of performing the leaning, the apparatus has the merit that the increase of the $NO_x$ emission is not apprehended during the fuel cut. Further, the apparatus diagnoses the catalyst deterioration by utilizing the behavior that the output of the downstream-side $O_2$ sensor is reset to the target value automatically by the second air-fuel ratio feedback control, and it need not perform any special air-fuel ratio control such as enriching the upstream-side air-fuel ratio during the diagnosis. Besides, when the enrichment is made, it is apprehended that the catalyst oxygen storage quantity will be saturated to the lower limit value, and that the emission of the components HC and CO will increase. Since, however, the second air-fuel ratio feedback control is utilized, the worsening of the exhaust gas is not incurred.

With such a prior-art apparatus, the precision of the deterioration decision of the catalyst is high in a case where the behavior of the second air-fuel ratio feedback control is the same every time, or under such an identical condition that an idling running continues after the release of the fuel cut. However, the apparatus has had the problem that the precision of the deterioration decision of the catalyst worsens sharply in a case where the gain of the second air-fuel ratio feedback control has changed, or in a case where a running condition has fluctuated in such a manner that the vehicle is accelerated or decelerated after the release of the fuel cut. The problem is ascribable to the fact that the behavior of the oxygen storage quantity of the catalyst cannot be precisely represented merely by a time period measurement.

Besides, the changing speed of the oxygen storage quantity in the catalyst is proportional to the deviation of the upstream-side air-fuel ratio from the theoretical air-fuel ratio and a suction air quantity. Therefore, in a case where the manipulation quantity of the upstream-side air-fuel ratio from the theoretical air-fuel ratio has been changed by the change of the gain of the second air-fuel ratio feedback control, the changing speed of the oxygen storage quantity changes, and hence, the resetting time period increases or decreases to degrade the deterioration decision precision. Further, in a case where the suction air quantity has been changed by the acceleration or deceleration, the changing speed of the oxygen storage quantity changes, and hence, the resetting time period increases or decreases to degrade the deterioration decision precision.

Besides, in a case where a λ (lamda) $O_2$ sensor whose output changes abruptly near the theoretical air-fuel ratio is employed as the upstream-side $O_2$ sensor, the deviation of the upstream-side air-fuel ratio from the theoretical air-fuel ratio cannot be detected on account of the two-valued characteristic of the λ $O_2$ sensor. Therefore, the apparatus has had such a problem that the behavior of the oxygen storage quantity of the catalyst cannot be calculated by considering also the air-fuel ratio of the upstream side.

SUMMARY OF THE INVENTION

This invention has been made in view of the above problems involved in the prior-art air-fuel ratio control apparatuses for an internal combustion engine, and it has for its object to provide an air-fuel ratio control apparatus for an internal combustion engine as can decide the deterioration of a catalyst at a high precision.

An air-fuel ratio control apparatus for an internal combustion engine according to this invention is an air-fuel ratio control apparatus for an internal combustion engine, having a catalyst which is disposed in an exhaust system of the internal combustion engine and which purifies exhaust gas from the internal combustion engine, a first air-fuel ratio sensor which is disposed on an upstream side of the catalyst and which detects an air-fuel ratio in upstream-side exhaust gas, a second air-fuel ratio sensor which is disposed on a downstream side of the catalyst and which detects an air-fuel ratio in downstream-side exhaust gas, first air-fuel ratio feedback control means for adjusting an air-fuel ratio to be fed into the internal combustion engine, in accordance with the output value of the first air-fuel ratio sensor and a predetermined control constant, and for oscillating the air-fuel ratio in the exhaust gas on the upstream side of the catalyst cyclically in a rich direction and in a lean direction, and second air-fuel ratio feedback control means for changing the control constant so that the output value of the second air-fuel ratio sensor and a target value may agree, and for manipulating an average air-fuel ratio obtained by averaging the air-fuel ratio in the upstream-side exhaust gas as is cyclically oscillated. The air-fuel ratio control apparatus for an internal combustion engine includes fuel cut state detection means for detecting a state of fuel cut in which feed of a fuel into the internal combustion engine is stopped. It also includes catalyst deterioration decision means for deciding deterioration of the catalyst on the basis of a period which is expended since the fuel cut state detection means has detected release of the state of the fuel cut, until the output value of the second air-fuel ratio sensor agrees with a predetermined resetting decision value near the target value, and a manipulation quantity of the average air-fuel ratio of the upstream side as is based on the second air-fuel ratio feedback control means.

The air-fuel ratio control apparatus for an internal combustion engine according to this invention includes the fuel cut state detection means for detecting the state of the fuel cut in which the feed of the fuel into the internal combustion engine is stopped, and the catalyst deterioration decision means for deciding the deterioration of the catalyst on the basis of the period which is expended since the fuel cut state detection means has detected the release of the state of the fuel cut, until the output value of the second air-fuel ratio sensor agrees with the predetermined resetting decision value near the target value, and the manipulation quantity of the average air-fuel ratio of the upstream side as is based on the second air-fuel ratio feedback control means, so that the precision of the deterioration decision of the catalyst can be enhanced.

The foregoing and other objects, features, aspects, and advantages of this invention will become more apparent from the following detailed description of this invention when taken in conjunction with the accompanying drawings.

BRIEF DESCRIPTION OF THE DRAWINGS

FIG. 16 is a timing chart for explaining the operation of the air-fuel ratio control apparatus according to Embodiment 1 of this invention;

DESCRIPTION OF THE PREFERRED EMBODIMENTS

Embodiment 1

Figure 1:
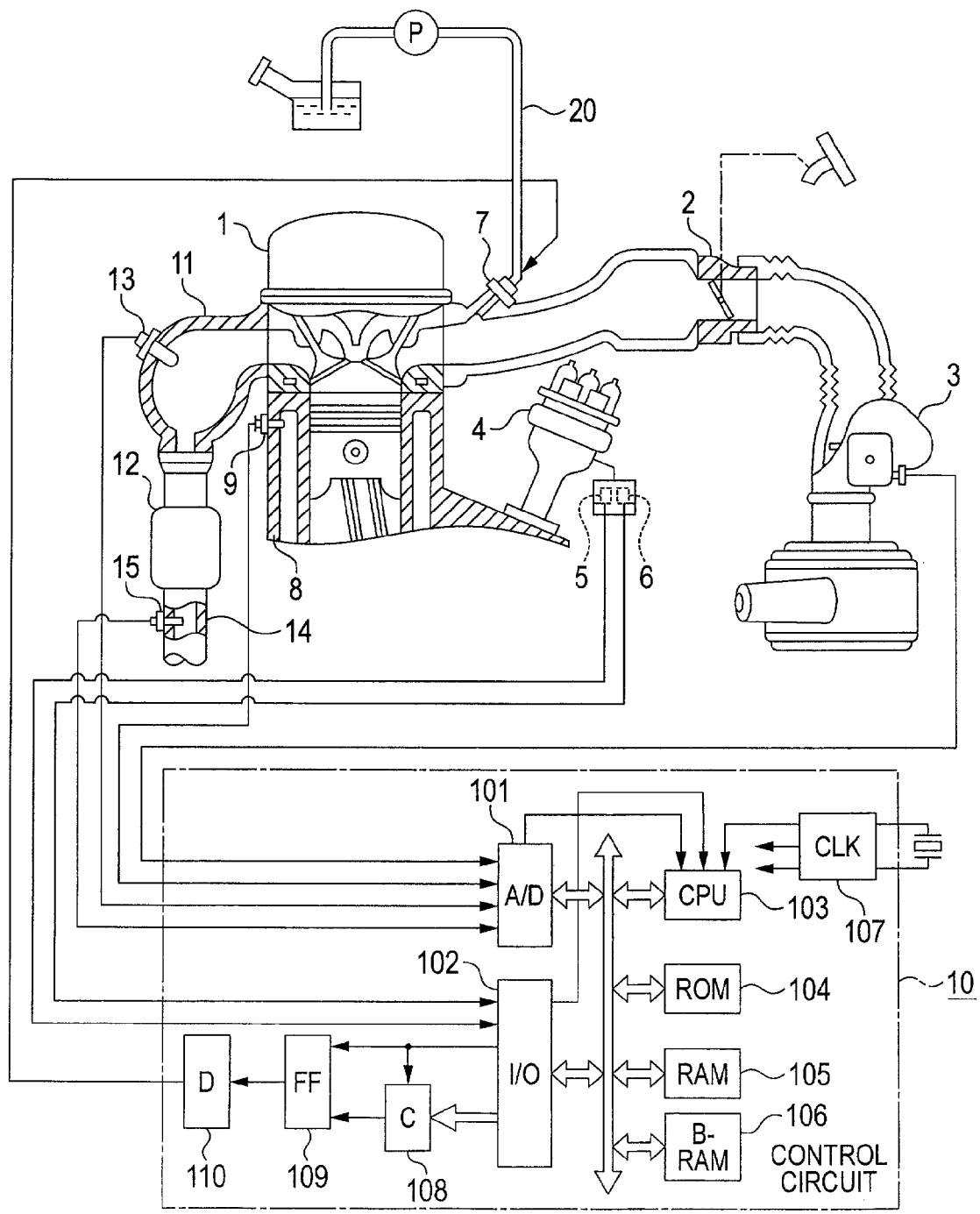
FIG. 1 is a whole schematic view showing an air-fuel ratio control apparatus for an internal combustion engine according to Embodiment 1 of this invention.

FIG. 1 is a whole schematic view showing an air-fuel ratio control apparatus for an internal combustion engine according to Embodiment 1 of this invention. Referring to FIG. 1, an airflow sensor 3 is disposed in the suction passage 2 of the engine proper 1 constituting the internal combustion engine. The airflow sensor 3 has a built-in hot wire for directly measuring a suction air quantity into the engine proper 1, and it generates an output signal (analog voltage) proportional to the suction air quantity. The output signal of the airflow sensor 3 is fed to an analog-to-digital converter (hereinbelow, termed the "A/D converter") 101 having a built-in multiplexer, within a control circuit 10 which is configured of a microcomputer.

The engine proper 1 is furnished with a distributor 4 which is relevant to the ignition control of a plurality of cylinders, and for which a pair of crankangle sensors 5 and 6 are disposed. By way of example, one 5 of the crankangle sensors generates a reference position detecting pulse signal every 720° in terms of a crankangle, while the other crankangle sensor 6 generates a reference position detecting pulse signal every 30° in terms of the crankangle. The pulse signals of the crankangle sensors 5 and 6 are fed to an input/output interface 102 within the control circuit 10, and the output signal of the crankangle sensor 6 is fed to the interrupt terminal of arithmetic means (hereinbelow, termed the "CPU") 103.

A fuel injection valve 7 for feeding pressurized fuel from a fuel feed system 20 to a suction port every cylinder of the engine proper 1 is disposed in the suction passage 2 of the engine proper 1. Besides, a water temperature sensor 9 for detecting the temperature of cooling water is disposed in the water jacket 8 of the cylinder block of the engine proper 1. The water temperature sensor 9 generates and outputs an electric signal (analog voltage) which corresponds to the temperature THW of the cooling water. The output signal of the water temperature sensor 9 is fed to the A/D converter 101 within the control circuit 10.

A catalyst converter (hereinbelow, simply termed the "catalyst") 12 in which a ternary converter for simultaneously purifying three harmful components HC, Co and $NO_x$ in exhaust gas is accommodated is disposed at that part of the exhaust system of the engine proper 1 which is located downstream with respect to an exhaust manifold 11. An upstream-side O2 sensor 13 being an upstream-side air-fuel ratio sensor is disposed in the exhaust manifold 11 which is located upstream of the catalyst 12, while a downstream-side $O_2$ sensor 15 being a downstream-side air-fuel ratio sensor is disposed in an exhaust pipe 14 which is located downstream of the catalyst 12.

Figure 2:
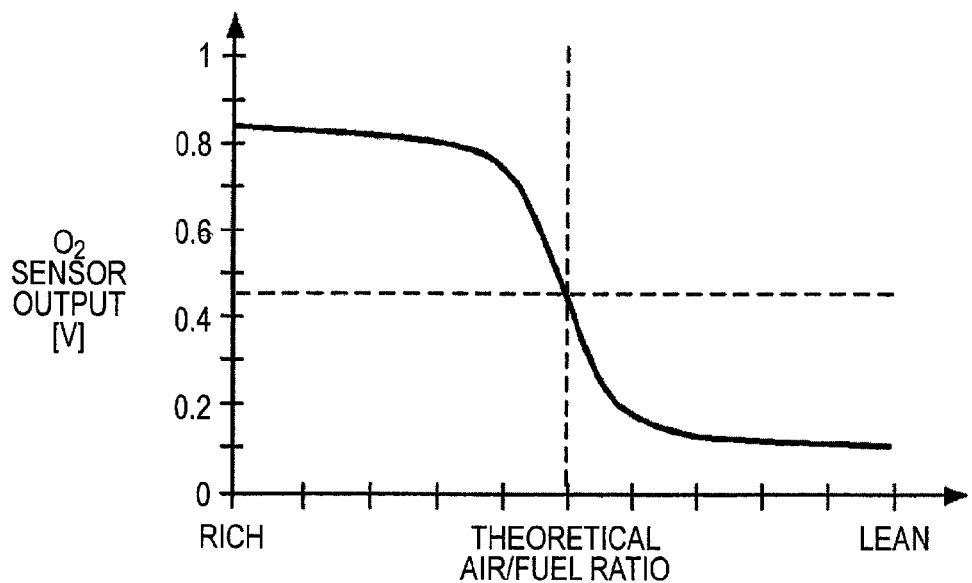
FIG. 2 is a graph showing the output characteristic of a λ (lamda) $O_2$ sensor.

The $O_2$ sensors 13 and 15 generate electric signals (voltage signals) corresponding to air-fuel ratios in the exhaust gas, as respective output values V1 and V2. The output values V1 and V2 of the respective $O_2$ sensors 13 and 15 as differ in correspondence with the air-fuel ratios are inputted to the A/D converter 101 within the control circuit 10. Besides, a λ (lamda) $O_2$ sensor is employed as each of the $O_2$ sensors 13 and 15. FIG. 2 is a graph showing the output characteristic of the λ $O_2$ sensor. As shown in FIG. 2, the λ $O_2$ sensor has the characteristic in which its output V changes abruptly near a theoretical air-fuel ratio.

The control circuit 10 includes the A/D converter 101, the input/output interface 102 and the CPU 103, and besides, a read-only memory (hereinbelow, termed the "ROM") 104, a random access memory (hereinbelow, termed the "RAM") 105, a back-up RAM 106, a clock generation circuit 107, and drive units 108, 109 and 110. Detection information items from various sensors such as the airflow sensor 3, crankangle sensors 5 and 6, and temperature sensor 9, as indicate the running conditions of the engine proper 1 are inputted to the control circuit 10. A pressure sensor (not shown) disposed downstream of a throttle valve within the suction passage 2, etc. are included in the various sensors.

In the control circuit 10, when a fuel feed quantity Qfuel to be stated later is calculated, signals based on the fuel feed quantity Qfuel are fed to the drive units 108, 109 and 110 through the input/output interface 102. Then, the fuel injection valve 7 is driven by the drive units 108, 109 and 110, and fuel in a quantity corresponding to the fuel feed quantity Qfuel is fed into the combustion chamber of the engine proper 1. By the way, interrupts into the CPU 103 occur at the end of the conversion (hereinbelow, termed the "A/D conversion") from the analog signal into the digital signal by the A/D converter 101, at the reception of the pulse signal of the crankangle sensor 6 through the input/output interface 102, at the reception of an interrupt signal from the clock generation circuit 107, and so forth.

The suction air quantity Qa of the airflow meter 3 and the cooling water temperature THW from the water temperature sensor 9 are accepted in accordance with an A/D conversion routine which is executed by the A/D converter 101 every predetermined time, and they are stored in the predetermined area of the RAM 105. That is, the suction air quantity Qa and the cooling water temperature THW stored in the RAM 105 are updated every predetermined time. Besides, the revolution speed Ne of the engine proper 1 is calculated by an interrupt signal which is generated every crankangle of 30° from the crankangle sensor 6, and it is stored in the predetermined area of the RAM 105.

Figure 3:
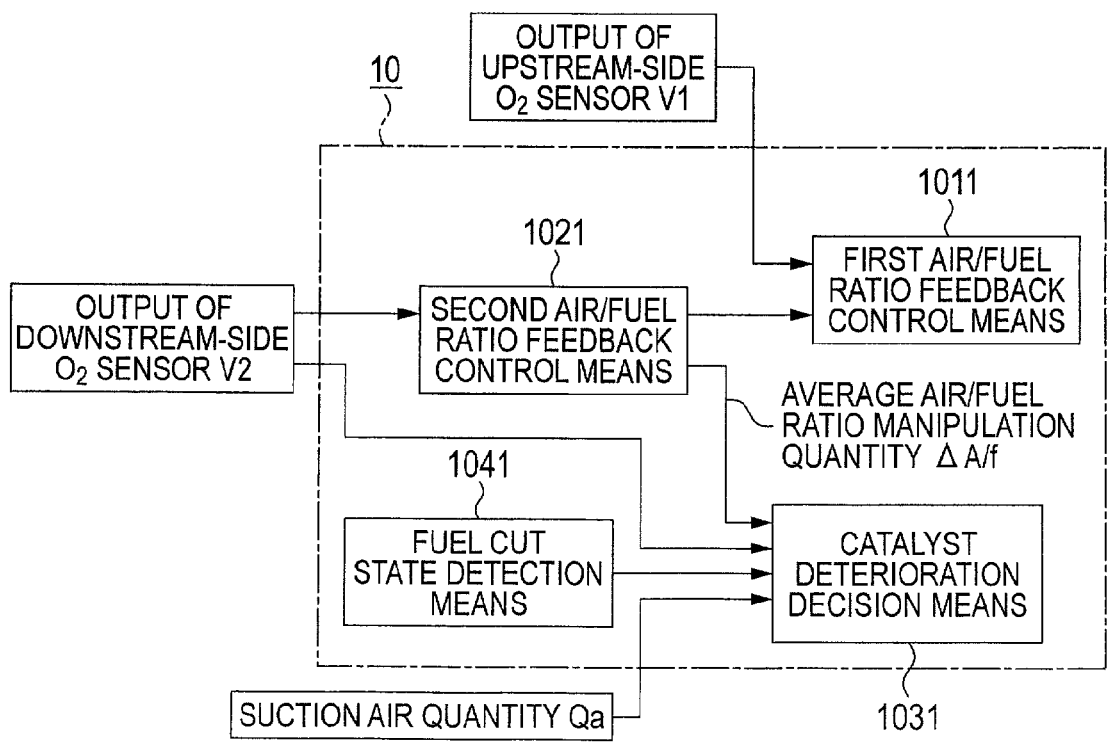
FIG. 3 is a functional block diagram showing the basic configuration of a control circuit according to Embodiment 1 of this invention.

Next, the configuration of the control circuit 10 will be described FIG. 3 is a functional block diagram showing the basic configuration of the control circuit 10 according to Embodiment 1 of this invention. Referring to FIG. 3, the control circuit 10 includes first air-fuel ratio feedback control means 1011, second air-fuel ratio feedback control means 1021, catalyst deterioration decision means 1031 and fuel cut state detection means 1041 as some of the processing functions of the CPU 103 thereof.

The output V1 of the upstream-side $O_2$ sensor 13 and the output of the second air-fuel ratio feedback control means 1021 are inputted to the first air-fuel ratio feedback control means 1011. The output V2 of the downstream-side $O_2$ sensor 15 is inputted to the second air-fuel ratio feedback control means 1021. That manipulation quantity $\Delta A/F$ of an average air-fuel ratio which is the output of the second air-fuel ratio feedback control means 1021, the output V2 of the downstream-side $O_2$ sensor 15, the output of the fuel cut state detection means 1041, and the detection value of the suction air quantity Qa from the airflow sensor 3 are inputted to the catalyst deterioration decision means 1031.

The first air-fuel ratio feedback control means 1011 controls the excitation drive means (not shown) of the fuel injection valve 7 through the drive units 108, 109 and 110 in accordance with the output value V1 of the upstream-side $O_2$ sensor 13 and predetermined control constants, whereby an air-fuel ratio to be fed to the engine proper 1 is controlled so as to cyclically oscillate in a rich direction and a lean direction astride the theoretical air-fuel ratio. Besides, the first air-fuel ratio feedback control means 1011 receives a command signal from the second air-fuel ratio feedback control means 1021 and corrects an upstream-side average air-fuel ratio by controlling the excitation drive means of the fuel injection valve 7 on the basis of the command signal, as will be stated later, and it operates the output V2 of the downstream-side $O_2$ sensor 15 so as to agree with a second target value VR2 as stated below.

The second air-fuel ratio feedback control means 1021 receives the output V2 of the downstream-side $O_2$ sensor 15 and calculates the manipulation quantity $\Delta A/F$ of the upstream-side average air-fuel ratio to be stated below, by a proportional calculation and an integral calculation in accordance with the deviation between the output V2 and the second target value VR2, thereby to output the command signal corresponding to the manipulation quantity $\Delta A/F$ of the upstream-side average air-fuel ratio, to the first air-fuel ratio feedback control means 1011 and to input the manipulation quantity $\Delta A/F$ of the upstream-side average air-fuel ratio to the catalyst deterioration decision means 1031. The catalyst deterioration decision means 1031 calculates a catalyst oxygen storage variation on the basis of the manipulation quantity $\Delta A/F$ of the upstream-side average air-fuel ratio based on the proportional calculation.

Besides, the second air-fuel ratio feedback control means 1021 alters its control gain to a predetermined set value during a catalyst deterioration analysis since the point of time of the release of a fuel cut state, until the output V2 of the downstream-side $O_2$ sensor 15 arrives at a predetermined voltage Xrh near the second target value VR2. That is, the second air-fuel ratio feedback control means 1021 manipulates the average air-fuel ratio of the upstream side by the proportional calculation and integral calculation, and it alters the control gain of the proportional calculation to the predetermined set value during the catalyst deterioration analysis since the point of time at which the fuel cut state has been released, until the output V2 of the downstream-side $O_2$ sensor 15 arrives at the predetermined voltage Xrh near the second target value VR2.

Further, the second air-fuel ratio feedback control means 1021 manipulates the average air-fuel ratio of the upstream side by the proportional calculation and integral calculation, and it stops the updating of an integral calculation value during the catalyst deterioration analysis since the point of time at which the fuel cut state has been released, until the downstream-side $O_2$ sensor output V2 arrives at the predetermined voltage Xrh near the second target value VR2.

In addition, the second air-fuel ratio feedback control means 1021 calculates the target average air-fuel ratio of the upstream side so that the output V2 of the downstream-side $O_2$ sensor 15 may agree with the second target value VR2, and it calculates the predetermined control constant of the first air-fuel ratio feedback control means 1011 on the basis of the target average air-fuel ratio, so as to alter the upstream-side average air-fuel ratio.

The catalyst deterioration decision means 1031 calculates the variation of the oxygen storage quantity of the catalyst 12 on the basis of the manipulation quantity $\Delta A/F$ of the upstream-side average air-fuel ratio based on the second air-fuel ratio feedback control means 1021 and the suction air quantity Qa from the airflow sensor 3, during the period until the output V2 of the downstream-side $O_2$ sensor 15 arrives at the predetermined voltage Xrh near the second target value VR2 since the fuel cut state detected by the fuel cut state detection means 1041 has been released. When the calculated variation is smaller than a predetermined value, the decision means 1031 decides that the catalyst 12 has been deteriorated.

Besides, the catalyst deterioration decision means 1031 decides that the catalyst 12 has been deteriorated, when a period for which the output V2 of the downstream-side $O_2$ sensor 15 is smaller than a predetermined value Xr1 to be stated later, within a predetermined period during fuel cut and after the release of the fuel cut state, is at least a predetermined period.

Further, the catalyst deterioration decision means 1031 sets the predetermined voltage Xrh which is compared with the output V2 of the downstream-side $O_2$ sensor 15, on a lean side with respect to the second target value VR2. Besides, the catalyst deterioration decision means 1031 suspends the deterioration diagnosis when the engine proper 1 has become a predetermined running condition such as abrupt acceleration or deceleration.

As will be stated later, the upstream-side average air-fuel ratio is controlled in such a way that the control constant, skip magnitudes RSR and RSL, integral constants KIR and KIL, delay times TDR and TDL, and first target value VR1 of the first air-fuel ratio feedback control means 1011 are altered by the second air-fuel ratio feedback control means 1021.

Figure 4:
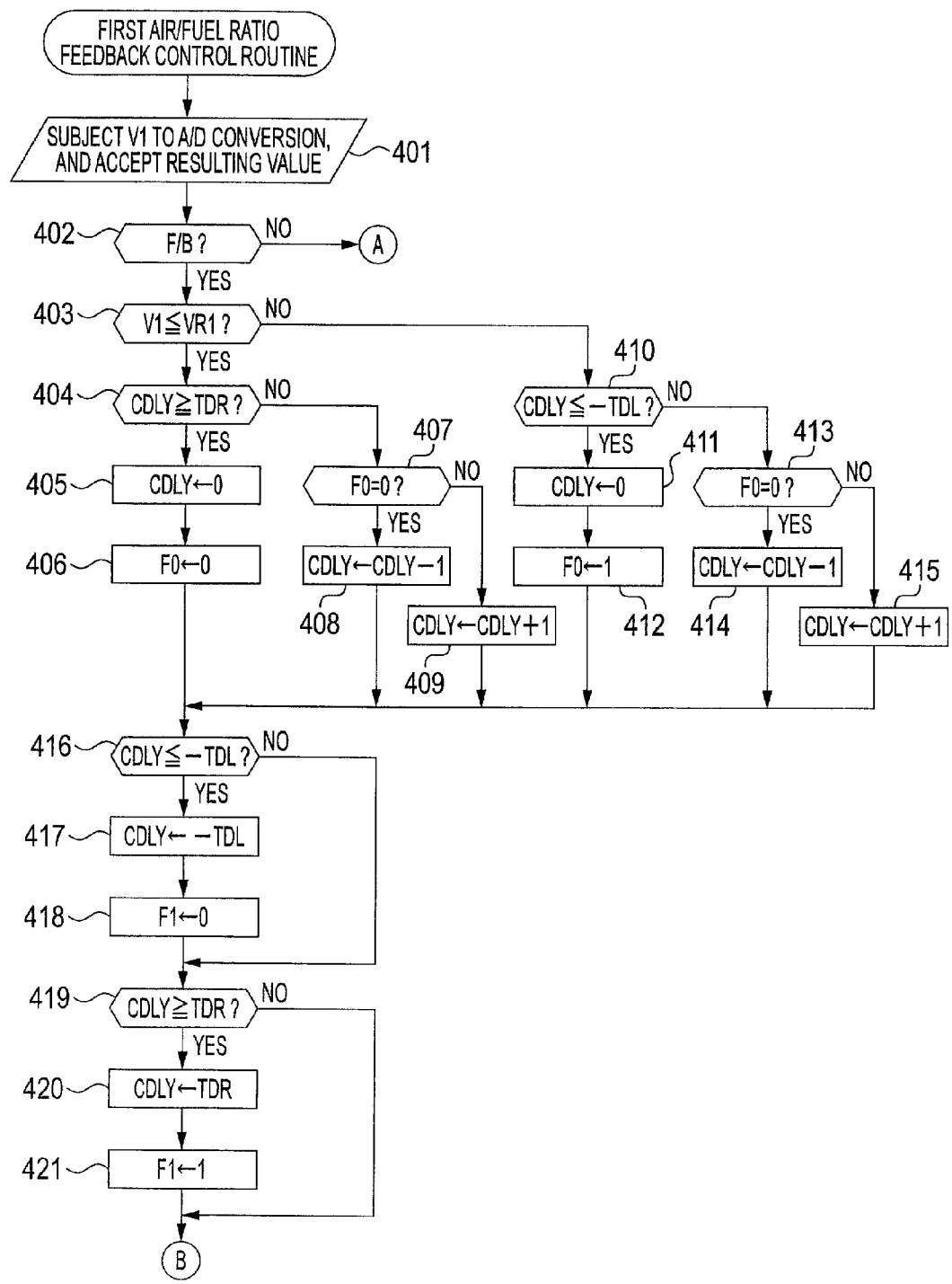
FIG. 4 is a flow chart for explaining part of the operation of a first air-fuel ratio feedback control.
Figure 5:
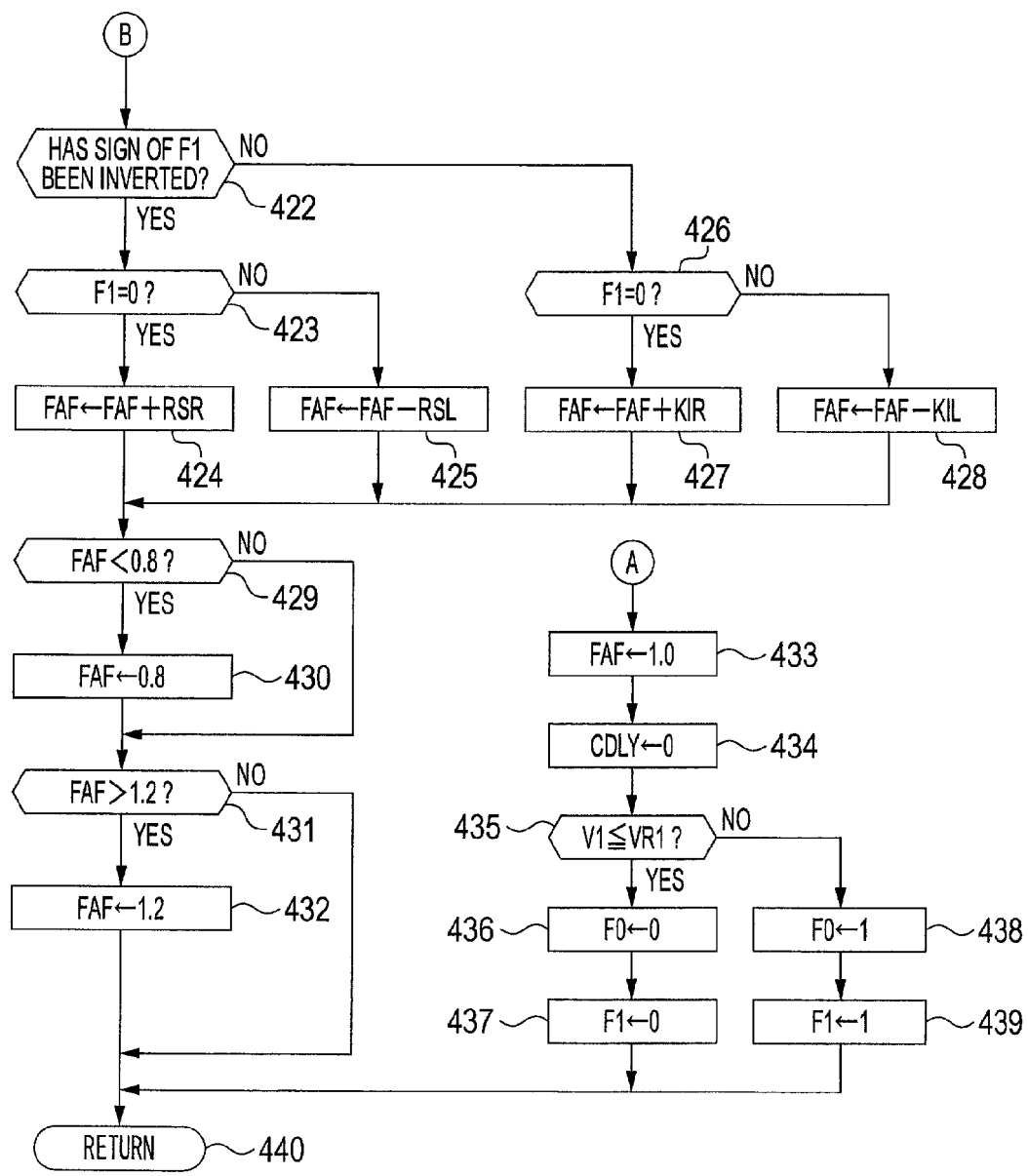
FIG. 5 is a flow chart for explaining the remaining part of the operation of the first air-fuel ratio feedback control.

FIG. 4 is a flow chart showing part of the routine of a first air-fuel ratio feedback control which calculates an air-fuel ratio correction coefficient FAF on the basis of the output of the upstream-side $O_2$ sensor 13. FIG. 5 is a flowchart showing the remaining part of the routine of the first air-fuel ratio feedback control which calculates the air-fuel ratio correction coefficient FAF on the basis of the output of the upstream-side $O_2$ sensor 13. The whole routine of the first air-fuel ratio feedback control shown in FIGS. 4 and 5 is executed every predetermined time, for example, 5 [ms]. Besides, in FIGS. 4 and 5, the signs "YES" and "NO" of branches from individual decision processing steps indicate "affirmation" and "negation", respectively.

First, referring to FIG. 4, at a step 401, the output V1 of the upstream-side $O_2$ sensor 13 is subjected to the A/D conversion by the A/D converter 101, and the resulting value is accepted and stored in the RAM 105. At a step 402, the CPU 103 decides whether or not a closed loop condition for the first air-fuel ratio feedback control based on the upstream-side $O_2$ sensor 13 holds.

The closed loop condition does not hold (NO) under the condition of an air-fuel ratio control except a theoretical air-fuel ratio control, for example, during the start of the engine proper 1, during an enrichment control at a low water temperature, during an enrichment control for a high load power increase, during a leaning control for the enhancement of a fuel cost, during a leaning control after the start of the engine proper 1, or during the fuel cut. Besides, the closed loop condition does not hold (NO) when the upstream-side $O_2$ sensor 13 is in an inactive state. Further, the closed loop condition does not hold (NO) when the upstream-side $O_2$ sensor 13 is faulty. In any other case, the closed loop condition holds (YES).

When the closed loop condition has been decided not to hold (NO), as the result of the decision at the step 402, "A" in FIG. 4 succeeds to "A" in FIG. 5, and the routine proceeds to a step 433, at which the air-fuel ratio correction coefficient FAF is set at "1.0". By the way, in this case, the air-fuel ratio correction coefficient FAF may well be made a value immediately before the end of a closed loop control, or a learnt value which is a value stored in the RAM 105. Subsequently, the routine proceeds to a step 434, at which a delay counter CDLY is reset to "0". Subsequently, at a step 435, the CPU 103 decides whether or not the output V1 of the upstream-side $O_2$ sensor 13 is, at most, the first target value VR1. When V1≦VR1 holds, that is, the air-fuel ratio is lean (YES), the routine proceeds to a step 436. At the step 436, a before-delay air-fuel ratio flag F0 is set at "0" which signifies "lean". Subsequently, the routine proceeds to a step 437, at which an after-delay air-fuel ratio flag F1 is set at "0" that signifies "lean".

On the other hand, when V1>VR1 holds as the result of the decision at the step 435, that is, the air-fuel ratio is rich (NO), the routine proceeds to a step 438, at which the before-delay air-fuel ratio flag F0 is set at "1" that signifies "rich". Besides, the routine proceeds to a step 439, at which the after-delay air-fuel ratio flag F1 is set at "1" that signifies "rich". In this way, the initial values at the time when the closed loop condition has held are set by the steps 434 to 439.

Referring back to FIG. 4, in a case (YES) where the closed loop condition has been decided to hold at the foregoing step 402, the routine proceeds to a step 403, at which the output V1 of the upstream-side $O_2$ sensor 13 and the first target value VR1 (for example, 0.45 [V]) are compared to decide whether or not the output V1 is, at most, the first target value VR1. When the output V1 of the upstream-side $O_2$ sensor 13 is, at most, the first target value VR1 at the decision based on the step 403, it is signified that the air-fuel ratio is lean, and when the output V1 exceeds the first target value VR1, it is signified that the air-fuel ratio is rich. When V1≦VR1 holds at the step 403, that is, the air-fuel ratio is decided to be lean (YES), the routine proceeds to a step 404.

At the step 404, the CPU 103 decides whether or not the delay counter CDLY is, at least, its maximum value "TDR". Subject to CDLY≧TDR (YES), the routine proceeds to a step 405, at which the delay counter CDLY is set at "0". Subsequently, the routine proceeds to a step 406, at which the before-delay air-fuel ratio flag F0 is set at "0" that signifies "lean", and which is followed by a step 416. When CDLY<TDR is decided (NO) at the step 404, whether or not the before-delay air-fuel ratio flag F0 is "0" signifying "lean" is decided at a step 407. When F0=0 holds (YES), the routine proceeds to a step 408, at which the delay counter CDLY is decremented one count, and when F0=0 does not hold (NO), the routine proceeds to a step 409, at which the delay counter CDLY is incremented one count, and which is followed by the step 416.

On the other hand, when V1>VR1 holds at the step 403, that is, the air-fuel ratio is decided to be rich (NO), the routine proceeds to a step 410, at which the CPU 103 decides whether or not the delay counter CDLY is, at most, its minimum value "−TDL". Subject to CDLY ≦−TDL (YES), the routine proceeds to a step 411. At the step 411, the delay counter CDLY is set at "0", and the routine proceeds to a step 412, at which the before-delay air-fuel ratio flag F0 is set at "1" signifying "rich", and which is followed by the step 416.

When CDLY>−TDL is decided at the step 410 (NO), the routine proceeds to a step 413, at which the CPU 103 decides whether or not the before-delay air-fuel ratio flag F0 is "0" signifying "lean". When F0=0 holds (YES), the routine proceeds to a step 414, at which the delay counter CDLY is decremented one count, and when F0=0 does not hold (NO), the routine proceeds to a step 415, at which the delay counter CDLY is incremented one count, and which is followed by the step 416.

At the step 416, the CPU 103 decides whether or not the delay counter CDLY is, at most, its minimum value "−TDL". Subject to CDLY≦−TDL (YES), the routine proceeds to a step 417. At the step 417, the delay counter CDLY is set at the minimum value "−TDL". That is, the delay counter CDLY is guarded with the minimum value "−TDL" by the steps 416 and 417. In this case, when the delay counter CDLY has arrived at the minimum value "−TDL", the routine proceeds to a step 418, at which the after-delay air-fuel ratio flag F4 is set at "0" that signifies "lean".

Incidentally, the minimum value "−TDL" of the delay counter CDLY is a "lean" delay time which serves to hold the judgment as the rich state even when the output V1 of the upstream-side $O_2$ sensor 13 changes from "rich" to "lean", and which is defined as a minus value.

Subsequently, the routine proceeds to a step 419, at which the CPU 103 decides whether or not the delay counter CDLY is, at least, its maximum value "TDR". Subject to CDLY≧TDR (YES), the routine proceeds to a step 420, at which the delay counter CDLY is set at the maximum value "TDR". That is, the delay counter CDLY is guarded with the maximum value "TDR" by the steps 419 and 420. In this case, when the delay counter CDLY has arrived at the maximum value "TDR", the routine proceeds to a step 421, at which the after-delay air-fuel ratio flag F1 is set at "1" signifying "rich".

Incidentally, the maximum value "TDR" of the delay counter CDLY is a "rich" delay time which serves to hold the judgment as the lean state even when the output V1 of the upstream-side $O_2$ sensor 13 changes from "lean" to "rich", and which is defined as a plus value.

Subsequently to the step 421, "B" in FIG. 4 succeeds to "B" in FIG. 5, and the routine proceeds to a step 422. At the step 422, the CPU 103 decides whether or not the sign of the after-delay air-fuel ratio flag F1 has been inverted, that is, whether or not the air-fuel ratio after the delay processing has been inverted. When the air-fuel ratio after the delay processing has been inverted (YES), the routine proceeds to a step 423, at which whether the inversion is from "rich" to "lean" or from "lean" to "rich" is decided on the basis of the value of the after-delay air-fuel ratio flag F1. More specifically, when F1=0 holds, the inversion is decided to be from "rich" to "lean" (YES), and the routine proceeds to a step 424. At the step 424, the skip magnitude RSR of the rich side is added to the air-fuel ratio correction coefficient FAF, that is, [FAF←FAF+RSR] is set, whereby the air-fuel ratio correction coefficient FAF is increased onto the rich side in skipped fashion.

To the contrary, when F1=0 does not hold at the step 423, the inversion is decided to be from "lean" to "rich" (NO). Then, the routine proceeds to a step 425, at which the skip magnitude RSL of the lean side is subtracted from the air-fuel ratio correction coefficient FAF, that is, [FAF←FAF−RSL] is set, whereby the air-fuel ratio correction coefficient FAF is decreased onto the lean side in skipped fashion. In this manner, the skip processing is executed by the step 424 or the step 425 on the basis of the result of the decision by the step 423.

When it has been decided at the foregoing step 422 that the sign of the after-delay air-fuel ratio flag F1 has not been inverted (NO), integral processing is executed by steps 426, 427 and 428. More specifically, whether or not F1=0 holds is decided at the step 426. When F1=0 holds, that is, the air-fuel ratio is lean (YES), the routine proceeds to the step 427, at which the integral constant KIR of the rich side is added to the air-fuel ratio correction coefficient FAF as FAF←FAF+KIR. On the other hand, when F1=1 holds at the step 426, that is, the air-fuel ratio is decided to be rich, the routine proceeds to the step 428, at which the integral constant KIL of the lean side is subtracted from the air-fuel ratio correction coefficient FAF as [FAF←FAF−KIL].

Here, the integral constant KIR of the rich side and the integral constant KIL of the lean side are respectively set to be sufficiently smaller as compared with the skip magnitude RSR of the rich side and the skip magnitude RSL of the lean side, and KIR<RSR and KIL<RSL hold. Accordingly, a fuel injection quantity is gradually increased in the lean state, that is, at F1=0, at the step 427, and the fuel injection quantity is gradually decreased in the rich state, that is, at F1=1, at the step 428.

The air-fuel ratio correction coefficients FAF calculated by the steps 424, 425, 427 and 428 are guarded to their minimum value, for example, [0.8] by steps 429 and 430 and to their maximum value, for example, [1.2] by steps 431 and 432. More specifically, when the air-fuel ratio correction coefficient FAF is decided to be less than [0.8] at the step 429 (YES), the routine proceeds to the step 430, at which the coefficient FAF is set at [0.8] and which is followed by the step 431. When it is decided at the step 431 that the air-fuel ratio correction coefficient FAF exceeds [1.2] (YES), the routine proceeds to the step 432 so as to set the coefficient FAF at [1.2].

Thus, in a case where the air-fuel ratio correction coefficient FAF has become excessively large or excessively small for any cause, the air-fuel ratio of the engine proper 1 is controlled with the value and is prevented from becoming overrich or overlean. The air-fuel ratio correction coefficient FAF calculated as stated above is stored in the RAM 105, whereupon the first air-fuel ratio feedback control routine is ended at a step 440.

Figure 6:
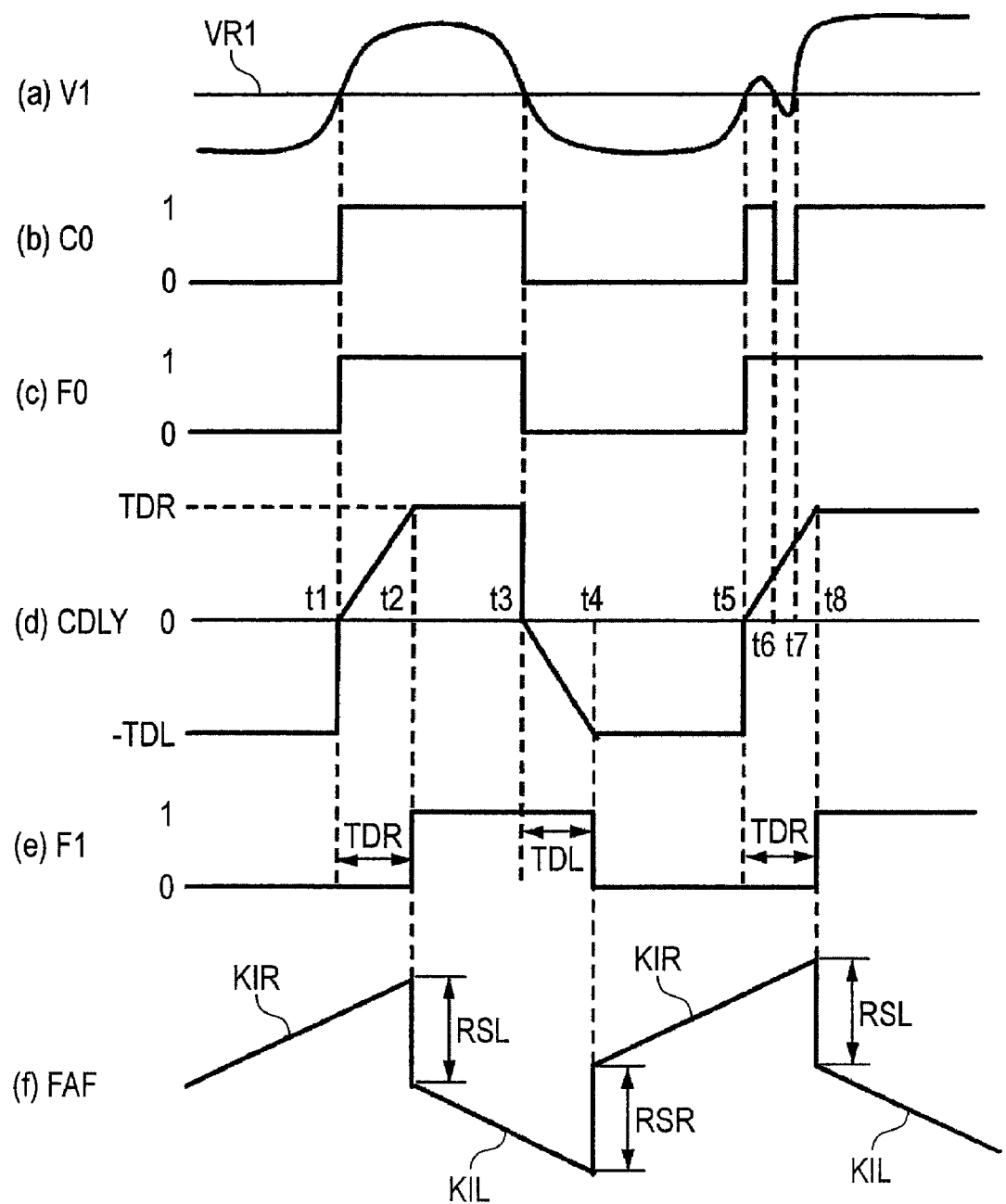
FIG. 6 is a timing chart for supplementarily explaining the flow charts shown in FIGS. 4 and 5.

FIG. 6 is timing charts for supplementarily explaining the operation based on the flow charts of FIGS. 4 and 5. The output V1 of the upstream-side $O_2$ sensor 13 changes as shown in (a) of FIG. 6, in correspondence with the air-fuel ratio. The output V1 is compared with the first target value VR1, whereby the signal C0 of the result of the comparison indicating whether the air-fuel ratio is rich "1" or lean "0" is obtained as shown in (b) of FIG. 6. As shown in (c) of FIG. 6, the before-delay air-fuel ratio flag F0 changes into the rich state "1" or the lean state "0" in correspondence with the comparison signal C0.

As shown in (d) of FIG. 6, the delay counter CDLY is counted up to the maximum value "TDR" in the rich state "1" of the before-delay air-fuel ratio flag F0, and it is counted down to the minimum value "−TDL" in the lean state "0". As a result, the after-delay air-fuel ratio flag F1 is formed as shown in FIG. (e) of 6. By way of example, even when the signal CO of the comparison result is inverted from the lean value "0" to the rich value "1" at a time t1, the after-delay air-fuel ratio flag F1 is held at the lean value "0" for the rich delay time "TDR", and it thereafter changes to the rich value "1" at a time t2.

Subsequently, even when the signal C0 of the comparison result is inverted from the rich value "1" to the lean value "0" at a time t3, the after-delay air-fuel ratio flag F1 is held at the rich value "1" in correspondence with the lean delay time "TDL", and it thereafter changes to the lean value "0" at a time t4. However, in a case where, after the start of the rich delay processing, the signal C0 of the comparison result is inverted in periods shorter than the rich delay time "TDR" as shown at times t5, t6 and t7, the before-delay air-fuel ratio flag F0 is not inverted for a time period t5-t8 during the delay processing as is expended until the delay counter CDLY arrives at the rich delay time "TDR".

Accordingly, the before-delay air-fuel ratio flag F0 is not influenced by the temporary fluctuation of the signal C0 of the comparison result, and it becomes more stable than the signal C0 of the comparison result. The air-fuel ratio correction coefficient FAF shown in (f) of FIG. 6 is obtained on the basis of the stabilized before-delay air-fuel ratio flag F0 and after-delay air-fuel ratio flag F1 based on the delay processing in this manner. More specifically, while the after-delay air-fuel ratio flag F1 has the lean value "0", the air-fuel ratio correction coefficient FAF increases rectilinearly on the basis of the integral constant KIR of the rich side. Besides, the skip magnitude RSL of the lean side is subtracted from the coefficient FAF at the point of time t2 at which the after-delay air-fuel ratio flag F1 is inverted from the lean value "0" to the rich value "1".

Subsequently, the air-fuel ratio correction coefficient FAF decreases rectilinearly on the basis of the integral constant KIL of the lean side since the point of time t2. Besides, the skip magnitude RSR of the rich side is added to the coefficient FAF at the point of time t4 at which the after-delay air-fuel ratio flag F1 is inverted from the rich value "1" to the lean value "0". Subsequently, the air-fuel ratio correction coefficient FAF increases rectilinearly on the basis of the integral constant KIR of the rich side since the point of time t4, until the after-delay air-fuel ratio flag F1 is inverted from the lean value "0" to the rich value "1" at the point of time t8. Thenceforth, the operation proceeds similarly.

In accordance with the air-fuel ratio correction coefficient FAF which is set as stated above, a fuel feed quantity Qfuel1 to be fed into the internal combustion engine proper 1 is adjusted on the basis of the following formula (1), and the air-fuel ratio in the internal combustion engine proper 1 is controlled:

$$Q\text{fuel1} = Q\text{fuel0} \times FAF \quad \text{Formula (1)}$$

Here, "Qfuel0" denotes a basic fuel quantity, which is calculated on the basis of the following formula (2):

$$Q\text{fuel0} = Q\text{acyl}/(\text{Target air-fuel ratio}) \quad \text{Formula (2)}$$

Here, "Qacyl" denotes an air quantity which is fed into the internal combustion engine proper 1 and which is calculated on the basis of the suction air quantity Qa detected by the airflow meter 3.

Figure 7:
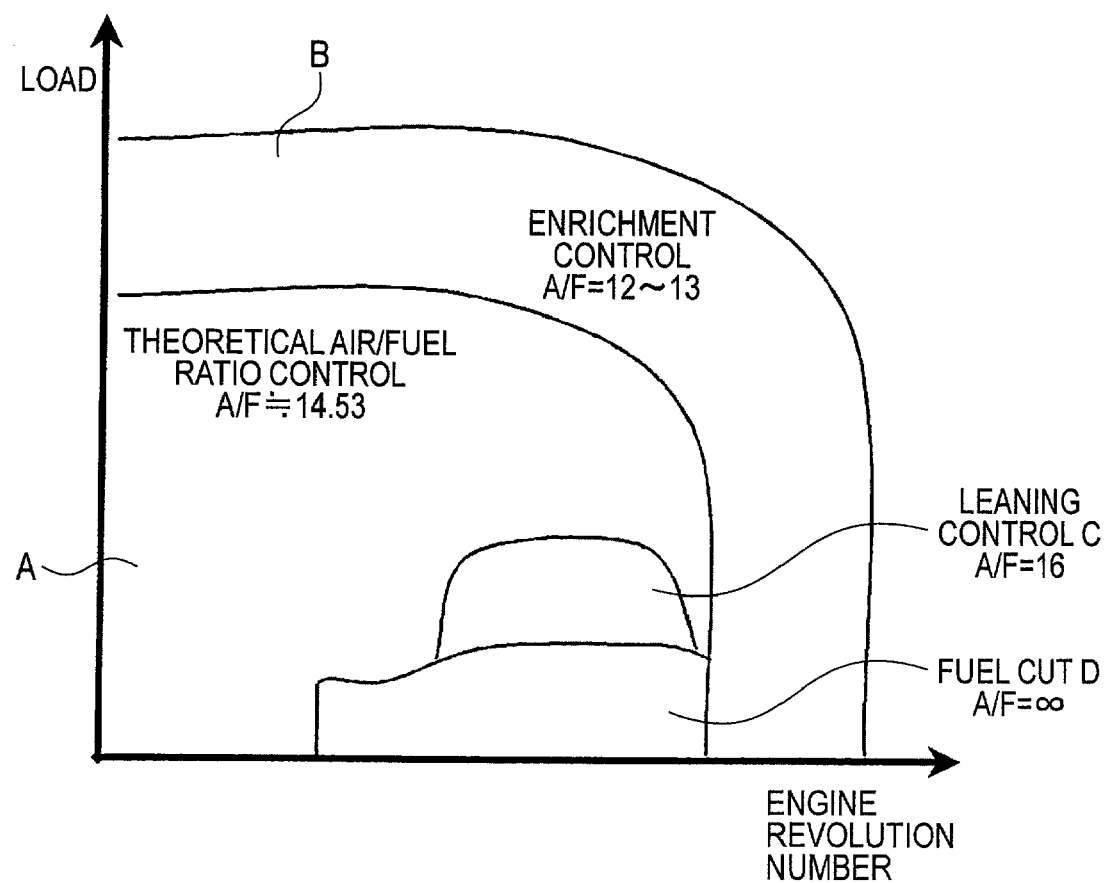
FIG. 7 is a characteristic diagram for explaining a target air-fuel ratio which changes depending upon running conditions.

As shown in FIG. 7, the target air-fuel ratio is set at an air-fuel ratio A/F which is set as a two-dimensional map composed of the revolution number of the engine proper 1 and a load. Referring to FIG. 7, in the region of a theoretical air-fuel ratio control A, the target air-fuel ratio is reflected in feed-forward fashion in such a way that the target average air-fuel ratio calculated by average air-fuel ratio oscillation means is set as "A/F≈14.35". In this way, a feedback follow-up delay in the case where the target value has changed can be bettered, and the fuel correction coefficient FAF can be maintained near the center of "1.0".

Incidentally, the target average air-fuel ratio is set as "A/F=12~13", in the region of the enrichment control B, it is set as "A/F=16" in the region of the leaning control C, and it is set as "A/F=∞" in the region of the fuel cut D.

Besides, a learning control which absorbs the secular changes and production dispersions of the constituents in the foregoing first air-fuel ratio feedback control is performed on the basis of the fuel correction coefficient FAF, and hence, the precision of the learning control is enhanced more when the fuel correction coefficient FAF is stable owing to the feed-forward correction. Further, the suction air quantity Qa may well be calculated in accordance with the revolution speed of the engine and the output of the pressure sensor disposed downstream of the throttle valve within the suction passage 2, or the opening degree of the throttle valve and the revolution speed of the engine.

Next, the second air-fuel ratio feedback control based on the downstream-side $O_2$ sensor 15 will be described. As disclosed also in Patent Document 1, there has been the air-fuel ratio control apparatus employing the second air-fuel ratio feedback control in which the skip magnitude RSR or RSL, the integral constant KIR or KIL, or the delay time TDR or TDL, or the first target value VR1 of the output V1 of the upstream-side $O_2$ sensor 13 as is the control constant in the first air-fuel ratio feedback control, is controlled variably in accordance with the output V2 of the downstream-side $O_2$ sensor 15.

In the second air-fuel ratio feedback control in such an air-fuel ratio control apparatus, when the skip magnitude RSR onto the rich side is made large by way of example, the average air-fuel ratio can be shifted onto the rich side, and also when the skip magnitude RSL onto the lean side is made small, the average air-fuel ratio can be shifted onto the rich side. On the other hand, when the skip magnitude RSL onto the lean side is made large, the average air-fuel ratio can be shifted onto the lean side, and also when the skip magnitude RSR onto the rich side is made small, the average air-fuel ratio can be shifted onto the lean side.

Accordingly, the average air-fuel ratio can be controlled in such a way that the skip magnitude RSR onto the rich side and the skip magnitude RSL onto the lean side are corrected in accordance with the output V2 of the downstream-side $O_2$ sensor 15. Besides, when the integral constant KIR of the rich side is made large, the average air-fuel ratio can be shifted onto the rich side, and also when the integral constant KIL of the lean side is made small, the average air-fuel ratio can be shifted onto the rich side, whereas when the "lean" integral constant KIL is made large, the average air-fuel ratio can be shifted onto the lean side. Further, also when the integral constant KIR of the rich side is made small, the average air-fuel ratio can be shifted onto the lean side. Accordingly, the average air-fuel ratio can be controlled by correcting the integral constant KIR of the rich side and the integral constant KIL of the lean side in accordance with the output V2 of the downstream-side $O_2$ sensor 15.

When the absolute values of the maximum value "TDR" and the minimum value "−TDL" of the delay counter CDLY are set as |TDR|>|TDL|, the relation between the delay time TDR of the rich side and the delay time TDL of the lean side becomes TDR>TDL, and the average air-fuel ratio can be shifted onto the rich side. To the contrary, when the absolute values of the maximum value "TDR" and the minimum value "−TDL" of the delay counter CDLY are set as |TDR|<|TDL|, the relation between the delay time TDR of the rich side and the delay time TDL of the lean side becomes TDR<TDL, and the average air-fuel ratio can be shifted onto the lean side.

That is, the air-fuel ratio can be controlled by correcting the delay times TDR and TDL in accordance with the output V2 of the downstream-side $O_2$ sensor 15. Further, when the first target value VR1 is made large, the average air-fuel ratio can be shifted onto the rich side, and when the first target value VR1 to be compared with the output V1 of the upstream-side $O_2$ sensor 13 is made small, the average air-fuel ratio can be shifted onto the lean side. Accordingly, the air-fuel ratio can be controlled by correcting the first target value VR1 in accordance with the output V2 of the downstream-side $O_2$ sensor 15.

In this manner, the average air-fuel ratio on the upstream side can be controlled in such a way that the skip magnitude RSR or RSL, the integral constant KIR or KIL, or the delay time TDR or TDL, or the first target value VR1 of the output V1 of the upstream-side $O_2$ sensor 13, which is the control constant of the foregoing first air-fuel ratio feedback control, is corrected in accordance with the output V2 of the downstream-side $O_2$ sensor 15. Besides, the controllability of the average air-fuel ratio can be enhanced by simultaneously manipulating two of more of the delay time TDR or TDL, the skip magnitude RSR or RSL, the integral constant KIR or KIL, and the first target value VR1, which are the control constants of the first air-fuel ratio feedback control.

Besides, as already proposed by the inventors of this invention, there has been an air-fuel ratio control apparatus wherein the manipulations of the control constants of the first air-fuel ratio feedback control are managed with the average air-fuel ratio in order to eliminate a drawback ascribable to the manipulations of the two or more of the control constants of the first air-fuel ratio feedback control and to positively utilize a degree of freedom. The air-fuel ratio control apparatus is such that a target average air-fuel ratio AFAVEobj is calculated by the second air-fuel ratio feedback control based on the output V2 of the downstream-side $O_2$ sensor 15, and that a converter which calculates the manipulation quantities of the control constants in the first air-fuel ratio feedback control from the target average air-fuel ratio AFAVEobj is disposed within the second air-fuel ratio feedback control.

When the two or more control constants in the first air-fuel ratio feedback control are manipulated, the "rich" or "lean" manipulation direction of the average air-fuel ratio can be managed owing to nonlinear interactions, but there has been the drawback that the management of the manipulation quantities becomes difficult, so the behavior of the second air-fuel ratio feedback control becomes unstable. The drawback, however, can be eliminated in such a way that the control constants in the first air-fuel ratio feedback control are set in accordance with the management index of the target average air-fuel ratio AFAVEobj.

Besides, the individual control constants in the first air-fuel ratio feedback control have merits and demerits in the control of the average air-fuel ratio, with regard to, for example, the control precision of the average air-fuel ratio, a manipulation width or control cycle, and the amplitude of the air-fuel ratio. The merits of the respective control constants can be utilized in such a way that the respective control constants in the first air-fuel ratio feedback control are subtly set in accordance with the operating point of the target average air-fuel ratio AFAVEobj.

The air-fuel ratio control apparatus for the internal combustion engine according to Embodiment 1 of this invention employs a so-called "double $O_2$ sensor system" which includes in addition to the first air-fuel ratio feedback control means, the second air-fuel ratio feedback control means having the converter that calculates the target average air-fuel ratio AFAVEobj in accordance with the output V2 of the downstream-side $O_2$ sensor 15 and that calculates the control constants in the first air-fuel ratio feedback control on the basis of the calculated target average air-fuel ratio AFAVEobj.

Figure 8:
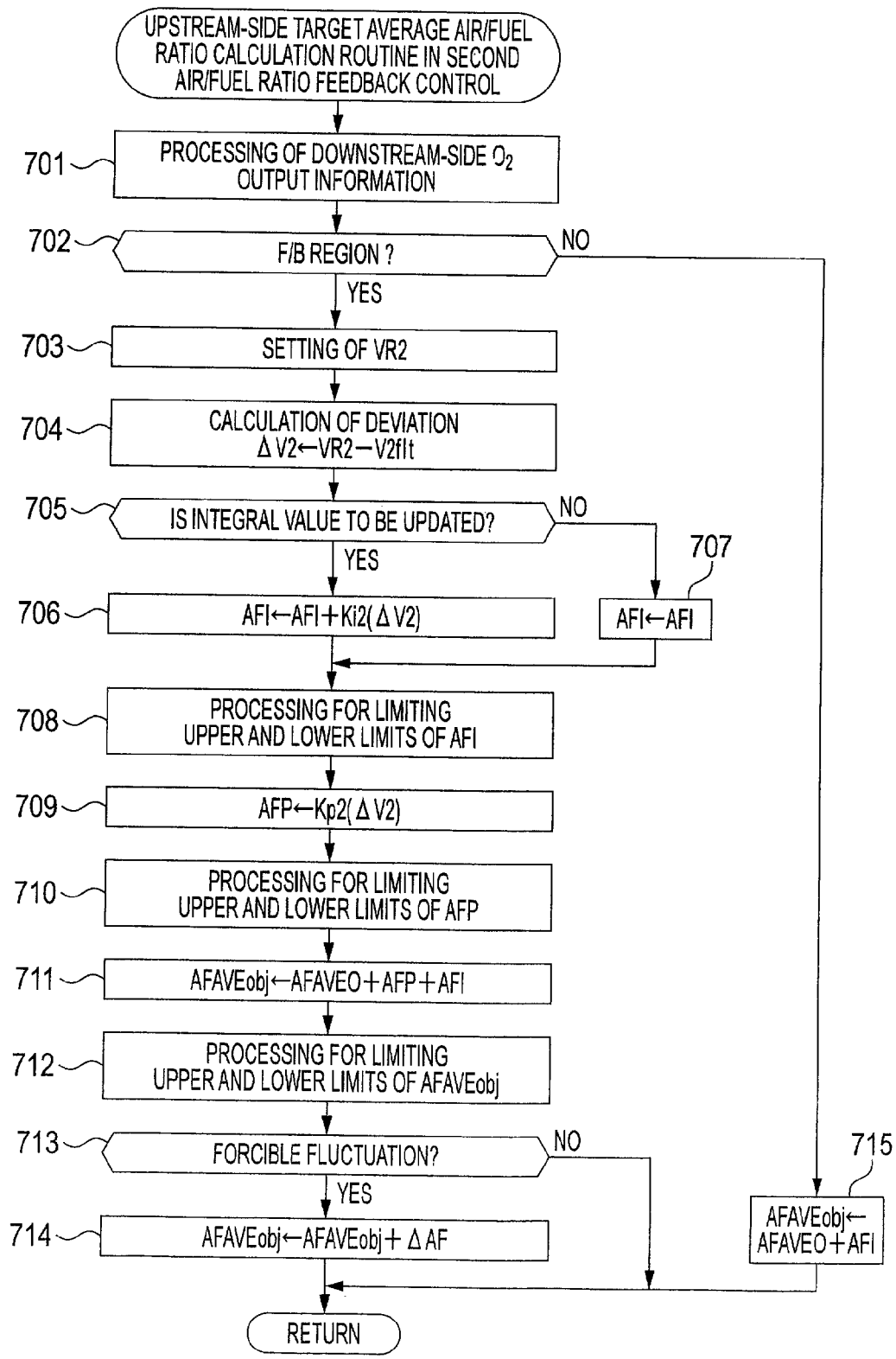
FIG. 8 is a flow chart for explaining the operation of a second air-fuel ratio feedback control.

FIG. 8 shows a flow chart of that calculation routine of an upstream-side target average air-fuel ratio which calculates the target average air-fuel ratio AFAVEobj on the upstream side of the catalyst 12 on the basis of the output V2 of the downstream-side $O_2$ sensor 15, in the second air-fuel ratio feedback control of the air-fuel ratio control apparatus for the internal combustion engine according to Embodiment 1 of this invention. The calculation routine shown in FIG. 8 is executed every predetermined time, for example, every 5 [ms]. Now, the calculation routine will be described in detail in conjunction with FIG. 8.

Referring to FIG. 8, first of all, at a step 701, the output V2 of the downstream-side $O_2$ sensor 15 is subjected to the A/D conversion by the A/D converter 101, and the resulting signal is accepted. The accepted output V2 of the downstream-side $O_2$ sensor 15 is subjected to flattening processing such as filter processing or averaging processing, thereby to obtain a filtered value V2flt, which is used for the control. In order to enhance a detection performance in the saturated state of the catalyst oxygen storage quantity to the upper limit value thereof as is attributed to the fuel cut, the filtered value V2flt is brought nearer to the actual output V2 of the downstream-side $O_2$ sensor 15 and is used for the control for the purpose of lowering a filter effect, during the fuel cut and for a predetermined period since the release of the fuel cut state.

At a step 702, the CPU 103 decides whether or not the control is in the region of the second air-fuel ratio feedback control based on the downstream-side $O_2$ sensor 15, that is, whether or not a closed loop condition for the second air-fuel ratio feedback control holds. The closed loop condition does not hold (NO) under the condition of an air-fuel ratio control except the theoretical air-fuel ratio control, for example, during the start of the engine proper 1, during the enrichment control at the low water temperature, during the enrichment control for the high load power increase, during the leaning control for the enhancement of the fuel cost, during the leaning control after the start of the engine proper 1, or during the fuel cut. Besides, the closed loop condition does not hold (NO) when the downstream-side $O_2$ sensor 15 is in an inactive state or when the downstream-side $O_2$ sensor 15 is faulty. In any other case, the closed loop condition holds (YES).

Incidentally, whether the downstream-side $O_2$ sensor 15 is in the active state or in the inactive state is decided by deciding whether or not a predetermined time has lapsed since the start of the engine proper 1, or whether or not the output level of the downstream-side $O_2$ sensor 15 has once exceeded a predetermined voltage.

When it is decided at the step 702 that the closed loop condition based on the second air-fuel ratio feedback control does not hold (NO), the routine proceeds to a step 715, at which the target average air-fuel ratio AFAVEobj is set at "an initial air-fuel ratio value AFAVE0+an integral calculation value AFI", and the calculation processing of the second air-fuel ratio feedback control is ended. By way of example, the initial air-fuel ratio value AFAVE0 is [14.53]. The integral calculation value AFI is a value immediately before the end of a closed loop control, that is, the second air-fuel ratio feedback control, and it is retained in the backup RAM 106. The initial air-fuel ratio value AFAVE0 and the integral calculation value AFI are retained every running condition, for example, every running zone divided on the basis of the revolution number, the load and the water temperature, and they are set values retained in the backup RAM 106, respectively.

When it is decided at the step 702 that the closed loop condition based on the second air-fuel ratio feedback control holds (YES), the routine proceeds to a step 703, at which the second target value VR2 to serve as the target value of the output V2 of the downstream-side $O_2$ sensor 15 is set. The second target value VR2 is set at the predetermined output value of the downstream-side $O_2$ sensor 15 near the theoretical air-fuel ratio at which the oxygen storage quantity in the catalyst 12 becomes about half of the upper limit value thereof and at which the purification state of this catalyst becomes high, and it is set near, for example, 0.45 [V]. This second target value VR2 may well be set at a somewhat high voltage at which the $NO_x$ purification rate of the catalyst 12 heightens, for example, near 0.75 [V], or at a somewhat low voltage at which the CO and HC purification rates heighten, for example, near 0.2 [V]. Alternatively, the voltage may well be altered depending upon running conditions, etc. In the case where the second target value VR2 is altered depending upon the running conditions, it may well be subjected to flattening processing for the second target value VR2, for example, first-order lag filter processing in order to relax an air-fuel ratio fluctuation due to a stepped change at the alteration.

Subsequently, at a step 704, the deviation ΔV2 between the second target value VR2 and the filtered value V2flt obtained by subjecting the output V2 of the downstream-side $O_2$ sensor 15 to the filter processing is calculated as [ΔV2=VR2−V2flt].

The next steps 705 to 711 form the processing of a PI control in which a proportional calculation P and an integral calculation I are performed in accordance with the deviation ΔV2, and they set that output V2 of the downstream-side $O_2$ sensor 15 which nullifies the deviation ΔV2. By way of example, when the output V2 of the downstream-side $O_2$ sensor 15 is smaller than the second target value VR2 (on the lean side), the target average air-fuel ratio AFAVEobj on the upstream side is set onto the rich side, and it acts to reset the output V2 to the second target value VR2.

The target average air-fuel ratio AFAVEobj on the upstream of the catalyst 12 is calculated by a general PI control unit in conformity with the following formula (3):

$$AFAVEobj = AFAVE0 + \Sigma(Ki2(\Delta V2)) + Kp2(\Delta V2) \quad \text{Formula (3)}$$

Here, "Ki2" denotes an integral gain, and "Kp2" denotes a proportional gain. "AFAVE0" denotes the initial air-fuel ratio value stated before, which is the value corresponding to the theoretical air-fuel ratio as is set every running condition and which is set, for example, near "14.53".

The integral calculation I integrates the deviation $\Delta V2$ and outputs the integral calculation value AFI, and it therefore operates comparatively slowly. Besides, the integral calculation I is effective to eliminate the steady deviation $\Delta V2$ in the output V2 of the downstream-side $O_2$ sensor 15 attributed to the characteristic fluctuation of the upstream-side $O_2$ sensor 13. Further, as the integral gain Ki2 is set larger, the absolute value of the manipulation quantity $\Sigma(Ki2(\Delta V2))$ becomes larger, and a control effect becomes greater. However, when the integral gain Ki2 is set very large, a phase lag enlarges, and a control loop becomes unstable to incur hunting. It is therefore necessary to set an appropriate gain.

Besides, the proportional calculation P generates an output in proportion to the deviation $\Delta V2$ and therefore demonstrates a quick responsiveness, and it is effective to quickly nullify the deviation $\Delta V2$. As the proportional gain Kp2 is set larger, the absolute value of a manipulation quantity (Kp2× $\Delta V2$) becomes larger, and the resetting speed of the second target value VR2 becomes higher. However, when the proportional gain Kp2 is set very large, the control loop becomes unstable to incur hunting. It is therefore necessary to set an appropriate gain.

Now, at the step 705, the CPU 103 decides whether or not the running of the engine proper 1 is in an updating condition in which the integral value of the deviation $\Delta V2$ is updated. The "updating condition" signifies that the running is not a transient running such as the fuel cut. The "transient running such as the fuel cut" signifies the very transient running such as the fuel cut and a running within a predetermined period since the very transient running. During the transient running such as the fuel cut, the upstream-side air-fuel ratio is greatly disordered, and also the downstream-side air-fuel ratio is disordered. When the integral calculation I is carried out in such a state, an erroneous value is integrated. Besides, since the integral calculation I operates comparatively slowly, an erroneous value is integrated also during the running within the predetermined period since the transient running, and a control performance worsens.

Therefore, the updating of the integral calculation I is temporarily stopped during the transient running, and an integral value at that time is retained, whereby such an erroneous integral calculation can be prevented. Further, also within the predetermined period since the transient running, the influence of the disorder of the air-fuel ratio remains for a while due to a lag ascribable to the oxygen storage action of the catalyst 12 chiefly, so that the updating of the integral value is inhibited also within the predetermined period since the transient running. Here, the "predetermined period since the transient running" is set at a period in which an integrated air quantity since the transient running arrives at a predetermined value. This is because the speed at which the oxygen storage quantity in the catalyst 12 is reset is proportional to the suction air quantity. The predetermined quantity of the integrated air quantity since the fuel cut is set in conformity with a new product catalyst with which the integrated air quantity till the resetting becomes the maximum, in order to ensure a convergence performance from the new product catalyst to the deteriorated catalyst.

Further, during the deterioration analysis after the release of the fuel cut state, by the catalyst deterioration decision means to be stated later, the running is in the same state as that of the transient running incurring the maloperation as stated above, and hence, the updating of the integral calculation I is temporarily stopped. In this way, the maloperation of the integral calculation after the release of the fuel cut state is prevented, whereby the performance of the convergence of the second target value VR2 onto the output V2 of the downstream-side $O_2$ sensor 15 can be stabilized to prevent the deterioration decision precision of the catalyst deterioration decision means from worsening.

When it is decided at the step 705 that the updating condition of the integral calculation value AFI holds (YES), the routine proceeds to the step 706, at which the integral calculation value AFI is updated on the basis of the following formula (4):

$$AFI = AFI + Ki2(\Delta V2) \quad \text{Formula (4)}$$

Figure 9:
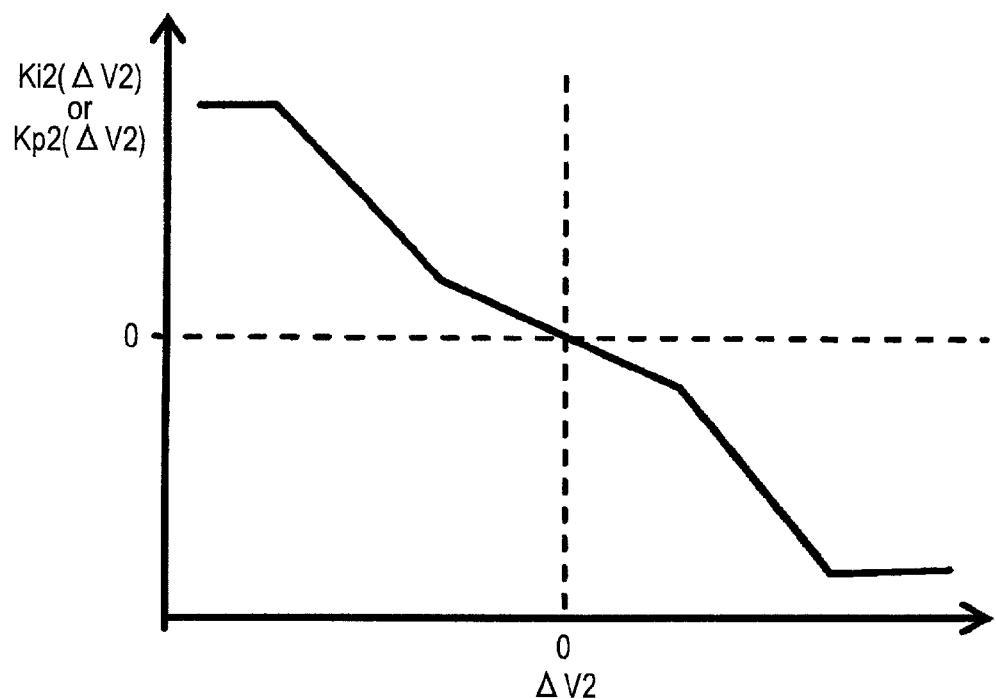
FIG. 9 is a characteristic diagram for supplementarily explaining the flow chart of FIG. 8.

Here, the integral calculation value AFI is the value which is retained in the backup RAM 106 every running condition. "Ki2($\Delta V2$)" denotes an updating quantity, which may be simply set as [Ki2($\Delta V$)=Ki2×$\Delta V2$] by using the predetermined integral gain Ki2. Alternatively, the updating quantity Ki2($\Delta V2$) may well be based on that setting of a so-called "variable gain" in which this updating quantity is set in accordance with the deviation $\Delta V2$ by employing a unidimensional map as shown in FIG. 9.

Besides, the fluctuation of the characteristic of the upstream-side $O_2$ sensor 13 to be compensated by the integral calculation value AFI changes depending upon the running conditions of an exhaust temperature, an exhaust pressure, etc. Therefore, the integral calculation value AFI is set every running condition and is retained in the backup RAM 106 beforehand. Each time the running condition changes, the integral calculation value AFI corresponding to the pertinent running condition is read out of the backup RAM 106 and is used in changed-over fashion.

Further, the integral calculation value AFI is retained in the backup RAM 106, whereby this integral calculation value AFI is reset every stop and restart of the engine proper 1, and the control performance can be prevented from degrading. Besides, since the catalyst deterioration analysis to be stated later depends upon the performance of the second air-fuel ratio feedback control, the precision of the deterioration analysis can be enhanced by the retention of the integral calculation value AFI for every running condition and a backup mechanism based on the backup RAM 106.

On the other hand, in a case where it has been decided at the step 705 in FIG. 8 that the integral value updating condition does not hold (NO), the routine proceeds to the step 707, at which the integral value is not updated. That is, [AFI=AFI] is set.

The step 706 or the step 707 is followed by the next step 708. At the step 708, the upper limit limitation processing and lower limit limitation processing of the integral calculation value AFI (hereinbelow, the processing shall be generally termed the "upper and lower limit limitation processing") are executed, and [AFImin<AFI<AFImax] is set. Here, "AFImin" denotes the integral calculation limitation minimum value, and "AFImax" denotes the integral calculation limitation maximum value. Since the characteristic fluctuation width of the upstream-side $O_2$ sensor 13 can be grasped beforehand, the appropriate integral calculation limitation minimum value AFImin and integral calculation limitation maximum value AFImax as can compensate the fluctuation width are set. Owing to such processing, it can be prevented to perform any excessive air-fuel ratio manipulation.

Subsequently, the routine proceeds to the step 709, at which proportional calculation processing [AFP=Kp2(ΔV2)] is carried out. Here, "AFP" denotes the proportional calculation value as stated before. "Kp2(ΔV2)" is an updating quantity, which may be simply set as [Kp2(ΔV)=Kp2×ΔV2] by using the predetermined proportional gain Kp2. Alternatively, the updating quantity Kp2(ΔV2) may well be based on that setting of a so-called "variable gain" in which this updating quantity is set in accordance with the deviation ΔV2 by employing a unidimensional map as shown in FIG. 9.

Besides, in the case where the running has become the transient running condition such as fuel cut, in which the integral value is not updated, the absolute value of the proportional gain Kp2 is set large within a predetermined period since the transient running, thereby to heighten the resetting speed of the quantity of oxygen storage by the catalyst 12 as has fluctuated due to the fuel cut. After the lapse of the predetermined period since the transient running, the absolute value of the proportional gain Kp2 is set small, thereby to prevent the manipulation quantity of the target air-fuel ratio from becoming excessive and a drivability from worsening.

The predetermined period since the transient running is set at a period in which an integrated air quantity since the transient running arrives at a predetermined value, in the same manner as in the case of the integral calculation. This is because the speed at which the oxygen storage quantity in the catalyst 12 is reset is proportional to the suction air quantity Qa. The predetermined quantity of the integrated air quantity since the fuel cut is set in conformity with the new product catalyst with which the integrated air quantity till the resetting becomes the maximum, in order to ensure the convergence performance from the new product catalyst to the deteriorated catalyst.

Besides, during the deterioration analysis after the release of the fuel cut state, by the catalyst deterioration decision means to be stated later, the proportional gain Kp2 may well be altered to a predetermined gain. The second air-fuel ratio feedback control during the deterioration analysis can have its behavior adjusted to a predetermined behavior which has been designed beforehand, or to a predetermined behavior with which the deterioration analysis is made with ease. In this case, the precision of a deterioration decision is enhanced. Due to, for example, the change of the magnitude of the proportional gain Kp2 or the set value of the variable gain, an overshoot magnitude to the second target value VR2 being the target value of the output V2 of the downstream-side $O_2$ sensor 15, the transient behavior of the second air-fuel ratio feedback control, etc. change, and hence, the precision of the deterioration decision employing the output V2 of the downstream-side $O_2$ sensor 15 changes.

The settings of the integral gain Ki2 and proportional gain Kp2 may well be altered depending upon the presence or absence of the catalyst deterioration based on the catalyst deterioration decision means to be stated later. The gains can be set appropriately in accordance with the change of the upper limit value of the oxygen storage quantity attributed to the catalyst deterioration. Thus, it is permitted to prevent hunting to the second target value VR2 being the target value of the output V2 of the downstream-side $O_2$ sensor 15, and to keep a follow-up performance, so that the performance of the second air-fuel ratio feedback control can be maintained.

Subsequently, the routine proceeds to the step 710, at which the upper and lower limit limitation processing of the proportional calculation value AFP [AFPmin<AFP<AFPmax] is executed. Here, "AFPmin" denotes the proportional calculation limitation minimum value, and "AFPmax" denotes the proportional calculation limitation maximum value. Owing to the processing, it can be prevented to perform any excessive air-fuel ratio manipulation.

Subsequently, the routine proceeds to the step 711, at which the proportional and integral calculation values (hereinbelow, termed the "PI calculation value") are totaled, and the target average air-fuel ratio AFAVEobj is calculated in conformity with the following formula (5):

$$AFAVEobj=AFAVE0+AFP+AFI \qquad \text{Formula (5)}$$

Here, "AFAVE0" denotes the initial value which has been set every running condition as stated before, and which is near, for example, "14.53". "AFI" denotes the integral calculation value calculated at the steps 705 to 708, while "AFP" denotes the proportional calculation value calculated at the steps 709 and 710.

Subsequently, the routine proceeds to a step 712, at which the upper and lower limit limitation processing of the target average air-fuel ratio AFAVEobj [AFAVEmin<AFAVEobj<AFAVEmax] is executed. Owing to the processing, it can be prevented to perform any excessive air-fuel ratio manipulation, and the worsening of the drivability, etc. are avoidable. Besides, upper and lower limit limitation values may well be set every running condition, and limitation values in the drivability as change depending upon the running condition can be coped with.

Subsequently, the routine proceeds to a step 713, at which the CPU 103 decides whether or not the running condition is a condition where the target average air-fuel ratio AFAVEobj is forcibly caused to fluctuate (hereinbelow, termed the "forcible fluctuation condition"). The forcible fluctuation condition includes a period during which the fault of the downstream-side $O_2$ sensor 15 is being diagnosed, a period during which the purification characteristic of the catalyst 12 is being bettered, or the like, and the forcible fluctuation is inhibited during the catalyst deterioration diagnosis after the release of the fuel cut state.

In a case where the forcible fluctuation condition holds (YES), the routine proceeds to a step 714, at which the forcible fluctuation based on the manipulation quantity ΔA/F of the average air-fuel ratio is added to the target average air-fuel ratio AFAVEobj as indicated by the following formula (6):

$$AFAVEobj=AFAVEobj+\Delta A/F \qquad \text{Formula (6)}$$

Figure 10:
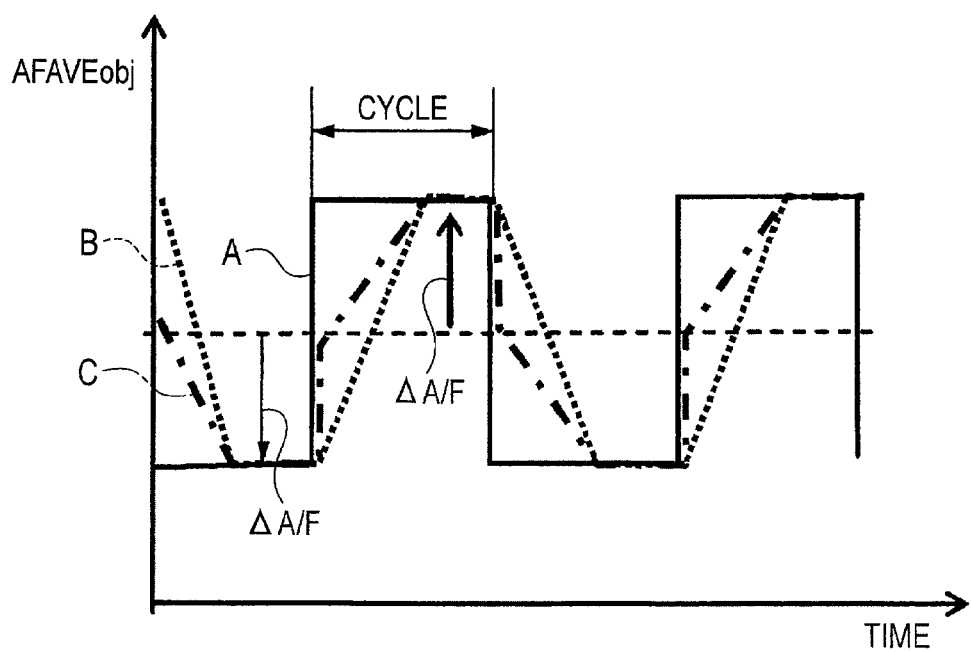
FIG. 10 is a characteristic diagram for supplementarily explaining the flow chart of FIG. 8.

Here, the manipulation quantity ΔA/F of the average air-fuel ratio is a fluctuation amplitude which is subjected to the forcible fluctuation. The fluctuation amplitude is set at a plus value or a minus value of predetermined absolute value, and the plus value and the minus value are changed-over in a predetermined cycle. By way of example, the fluctuation amplitude is changed-over to [ΔA/F=+0.25] or [ΔA/F=−0.25] in the predetermined cycle. In this case, the fluctuation amplitude may be changed-over stepwise as indicated by a solid line A in FIG. 10, or it may well be set as any desired waveform of certain predetermined amplitude and cycle as indicated by a dotted line B or a dot-and-dash line C. The fluctuation amplitude and cycle are set every running condition, and it is possible to satisfy required conditions which change depending upon running conditions, for example, the response lag of a controlled object, limits in the drivability, and the purification characteristic of the catalyst. The second air-fuel ratio feedback control is ended by the above operations.

Figure 11:
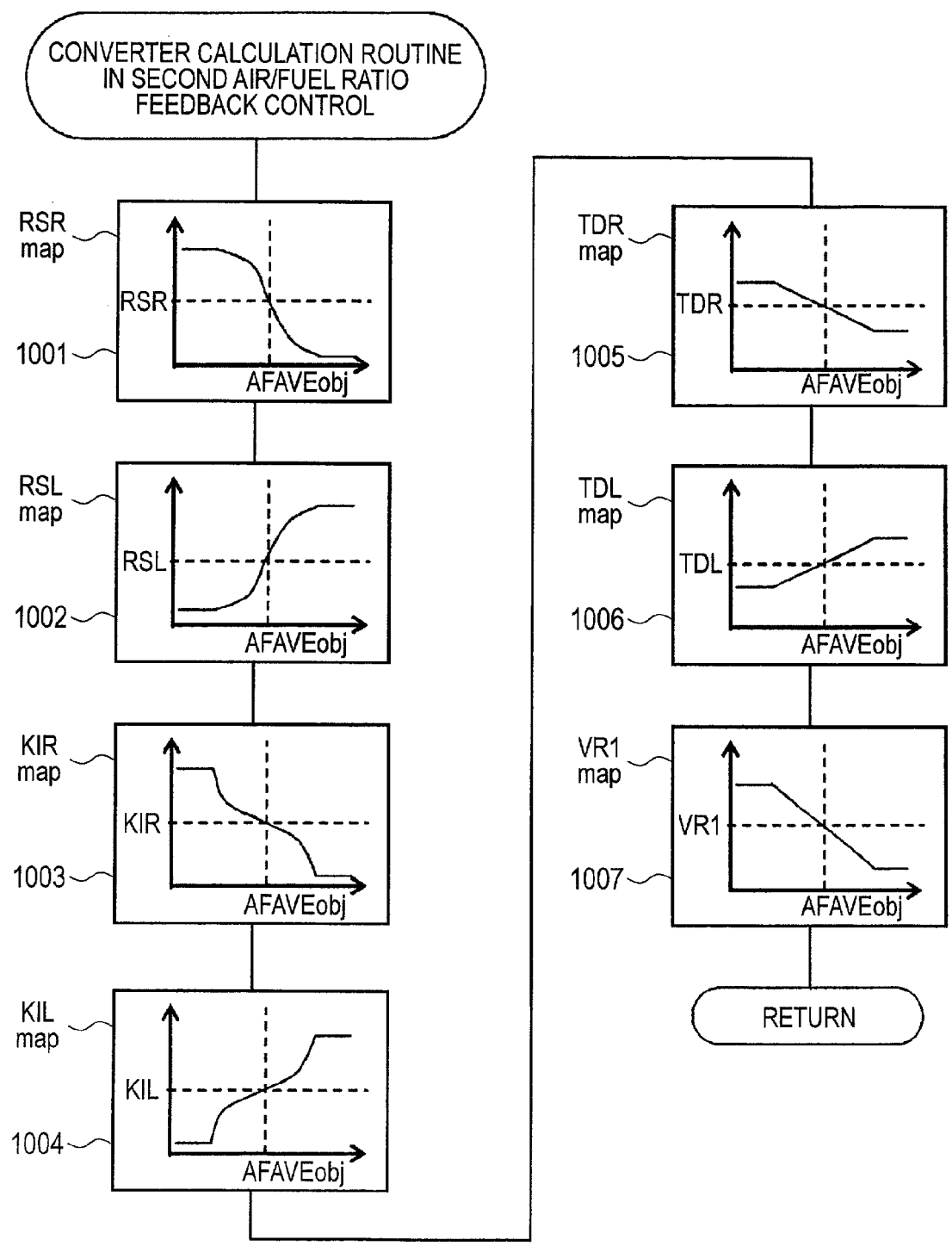
FIG. 11 is a flow chart for explaining the operation of the second air-fuel ratio feedback control.

FIG. 11 shows the calculation routine of the converter by which in the second air-fuel ratio feedback control, the respective skip magnitudes RSR and RSL, the respective integral constants KIR and KIL, the respective delay times TDR and TDL, and the first target value VR1 as are the first control constants in the first air-fuel ratio feedback control are set in accordance with the target average air-fuel ratio AFAVEobj on the upstream side. The calculation routine is executed every predetermined time, for example, every 5 [ms].

Referring to FIG. 11, first of all, at a step 1001, the skip magnitude RSR onto the rich side is calculated in accordance with the target average air-fuel ratio AFAVEobj. The calculation is performed using a unidimensional map RSRmap, in which the set values of the skip magnitude RSR corresponding to the values of the target average air-fuel ratio AFAVEobj are held on the basis of desk-top calculations or experiments beforehand as will be stated later. The set value of the skip magnitude RSR corresponding to the inputted value of the target average air-fuel ratio AFAVEobj is searched for and outputted from the unidimensional map RSRmap. The unidimensional map RSRmap is prepared every running condition, and the unidimensional map RSRmap is changed-over for the map search in accordance with the change of the running condition. By way of example, the unidimensional map RSRmap is held every running zone which is divided on the basis of the predetermined revolution number, the load and the water temperature of the engine proper 1.

Subsequently, at a step 1002, the skip magnitude RSL onto the lean side is calculated in accordance with the target average air-fuel ratio AFAVEobj. The calculation is performed using a unidimensional map RSLmap, in which the set values of the skip magnitude RSL corresponding to the values of the target average air-fuel ratio AFAVEobj are held on the basis of desk-top calculations or experiments beforehand as will be stated later. The set value of the skip magnitude RSL corresponding to the inputted value of the target average air-fuel ratio AFAVEobj is searched for and outputted from the unidimensional map RSLmap. The unidimensional map RSLmap is prepared every running condition, and the unidimensional map RSLmap is changed-over for the map search in accordance with the change of the running condition. By way of example, the unidimensional map RSLmap is held every running zone which is divided on the basis of the predetermined revolution number, the load and the water temperature of the engine proper 1.

Subsequently, at a step 1003, the integral constant KIR of the rich side is calculated in accordance with the target average air-fuel ratio AFAVEobj. The calculation is performed using a unidimensional map KIRmap, in which the set values of the integral constant KIR corresponding to the values of the target average air-fuel ratio AFAVEobj are held on the basis of desk-top calculations or experiments beforehand as will be stated later. The set value of the integral constant KIR corresponding to the inputted value of the target average air-fuel ratio AFAVEobj is searched for and outputted from the unidimensional map KIRmap. The unidimensional map KIRmap is prepared every running condition, and the unidimensional map KIRmap is changed-over for the map search in accordance with the change of the running condition. By way of example, the unidimensional map KIRmap is held every running zone which is divided on the basis of the predetermined revolution number, the load and the water temperature of the engine proper 1.

The routine subsequently proceeds to a step 1004, at which the integral constant KIL of the lean side is calculated in accordance with the target average air-fuel ratio AFAVEobj. The calculation is performed using a unidimensional map KILmap, in which the set values of the integral constant KIL corresponding to the values of the target average air-fuel ratio AFAVEobj are held on the basis of desk-top calculations or experiments beforehand as will be stated later. The set value of the integral constant KIL corresponding to the inputted value of the target average air-fuel ratio AFAVEobj is searched for and outputted from the unidimensional map KILmap. The unidimensional map KILmap is prepared every running condition, and the unidimensional map KILmap is changed-over for the map search in accordance with the change of the running condition. By way of example, the unidimensional map KILmap is held every running zone which is divided on the basis of the predetermined revolution number, the load and the water temperature of the engine proper 1.

Subsequently, at a step 1005, the delay time TDR of the rich side is calculated in accordance with the target average air-fuel ratio AFAVEobj. The calculation is performed using a unidimensional map TDRmap, in which the set values of the delay time TDR corresponding to the values of the target average air-fuel ratio AFAVEobj are held on the basis of desk-top calculations or experiments beforehand as will be stated later. The set value of the delay time TDR corresponding to the inputted value of the target average air-fuel ratio AFAVEobj is searched for and outputted from the unidimensional map TDRmap. The unidimensional map TDRmap is prepared every running condition, and the unidimensional map TDRmap is changed-over for the map search in accordance with the change of the running condition. By way of example, the unidimensional map TDRmap is held every running zone which is divided on the basis of the predetermined revolution number, the load and the water temperature of the engine proper 1.

At a step 1006, the delay time TDL of the lean side is calculated in accordance with the target average air-fuel ratio AFAVEobj. The calculation is performed using a unidimensional map TDLmap, in which the set values of the delay time TDL corresponding to the values of the target average air-fuel ratio AFAVEobj are held on the basis of desk-top calculations or experiments beforehand as will be stated later. The set value of the delay time TDL corresponding to the inputted value of the target average air-fuel ratio AFAVEobj is searched for and outputted from the unidimensional map TDLmap. The unidimensional map TDLmap is prepared every running condition, and the unidimensional map TDLmap is changed-over for the map search in accordance with the change of the running condition. By way of example, the unidimensional map TDLmap is held every running zone which is divided on the basis of the predetermined revolution number, the load and the water temperature of the engine proper 1.

Subsequently, at a step 1007, the first target value VR1 is calculated in accordance with the target average air-fuel ratio AFAVEobj. The calculation is performed using a unidimensional map VR1 map, in which the set values of the first target value VR1 corresponding to the values of the target average air-fuel ratio AFAVEobj are held on the basis of desk-top calculations or experiments beforehand as will be stated later. The set value of the first target value VR1 corresponding to the inputted value of the target average air-fuel ratio AFAVEobj is searched for and outputted from the unidimensional map VR1 map. The unidimensional map VR1 map is prepared every running condition, and the unidimensional map VR1 map is changed-over for the map search in accordance with the change of the running condition. By way of example, the unidimensional map VR1 map is held every running zone which is divided on the basis of the predetermined revolution number, the load and the water temperature of the engine proper 1. The processing of the converter calculation routine in the second air-fuel ratio feedback control is ended as thus far described.

Incidentally, the calculation at each of the steps 1001 to 1007 need not always be based on the unidimensional map, but it is also allowed to employ means representing the relation between the input and the output, for example, an approximate formula, or a multidimensional map or a high-order function which corresponds to more inputs.

In this manner, the skip magnitudes RSR and RSL, integral constants KIR and KIL, delay times TDR and TDL, and first target value VR1 which are the first control constants are respectively calculated in accordance with the target average air-fuel ratio AFAVEobj. The set values of the respective control constants are set on the basis of the desk-top calculations or experimental values beforehand in order that the actual average air-fuel ratio in the upstream of the catalyst may become the inputted target average air-fuel ratio AFAVEobj. Besides, the set values of the first control constants are changed depending upon the running conditions, whereby the set values can be set so that the target average air-fuel ratio AFAVEobj and the actual average air-fuel ratio may agree irrespective of the running conditions.

Accordingly, even in the case where the λ (lamda) type incapable of detecting the actual air-fuel ratio is employed for the upstream-side $O_2$ sensor 13, the behavior of the average air-fuel ratio of the upstream side can be grasped. In the catalyst deterioration decision means to be stated later, the behavior of the oxygen storage quantity in the catalyst 12 can be estimated by utilizing the target average air-fuel ratio AFAVEobj, and the precision of the deterioration decision is enhanced.

Figure 12:
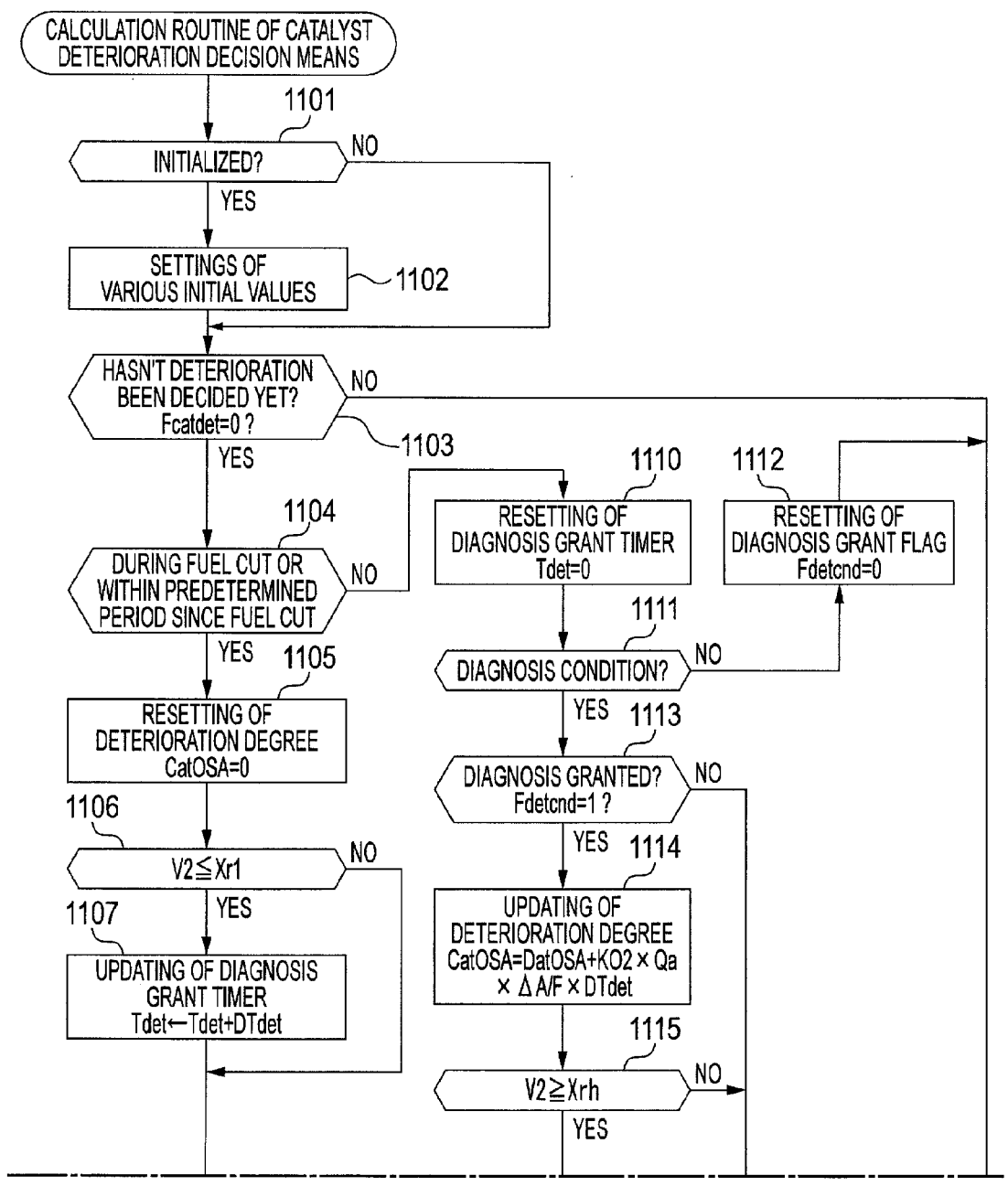
FIG. 12 is a flow chart for explaining the operation of catalyst deterioration decision means.
Figure 12:
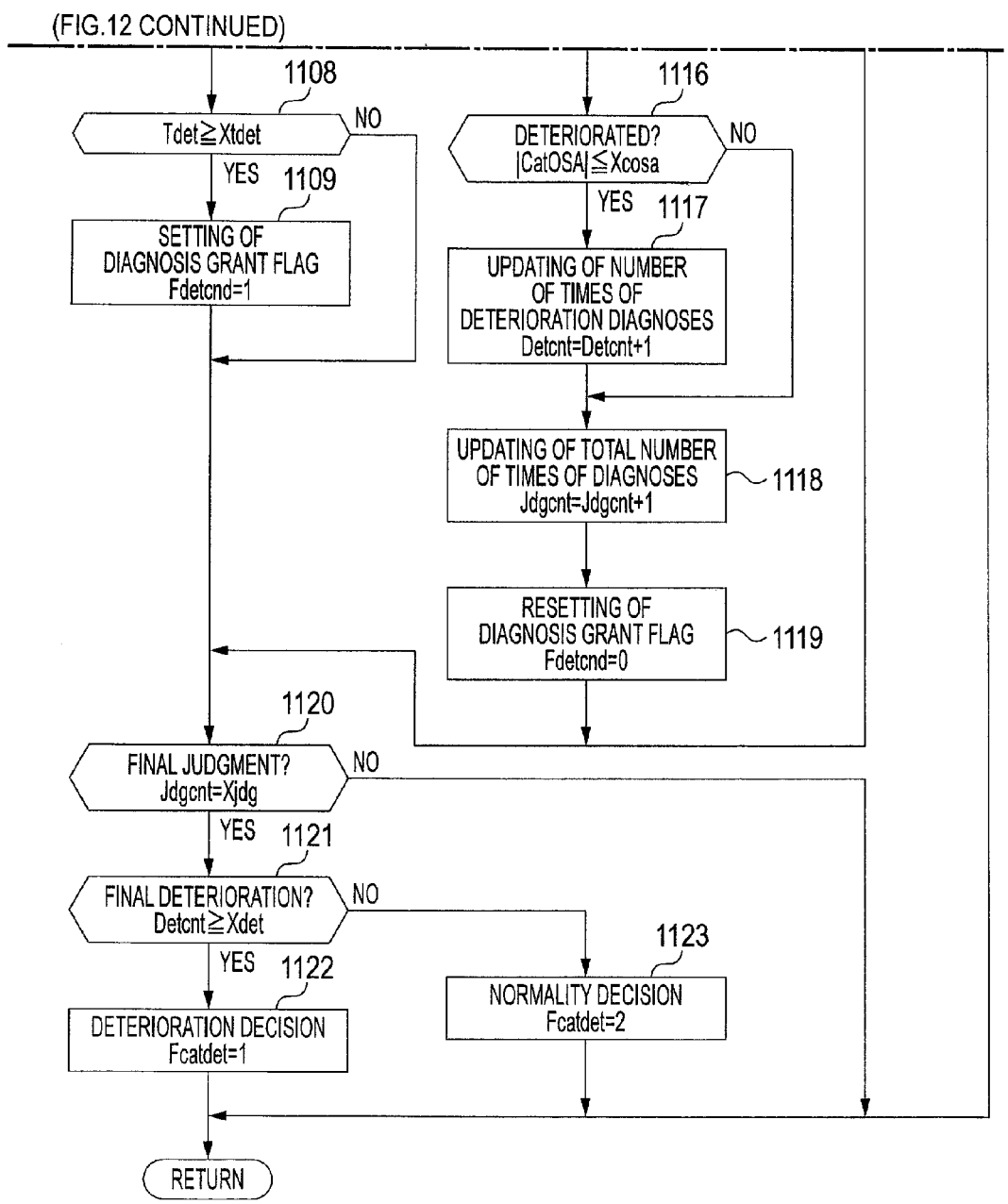

FIG. 12 shows the calculation routine of the catalyst deterioration detection means for detecting the presence or absence of the deterioration of the catalyst 12 on the basis of the output V2 of the downstream-side $O_2$ sensor 15 after the fuel cut, the manipulation quantity of the average air-fuel ratio on the upstream side of the catalyst 12 as is based on the second air-fuel ratio feedback control, and the suction air quantity. The calculation routine is executed every predetermined time, for example, every 5 [ms].

Referring to FIG. 12, at a step 1101, the CPU 103 decides whether or not the initialized condition of the deterioration decision holds. In a case where the initialized condition holds (YES), the routine proceeds to a step 1102, at which various parameters are reset to initial values. In a case where the condition does not hold (NO), the routine proceeds to a step 1103 without executing the step 1102. The initialized condition corresponds to the time when a controller is first activated after the re-connection of a battery, the time when a reset signal has been inputted from an external communication equipment or the like for maintenance, the time when the internal combustion engine is started, or the like.

At the step 1102, the various parameters of the deterioration decision are reset to the initial values, and the routine thereafter proceeds to the step 1103. By way of example, a "deterioration decision result flag" Fcatdet is set at "0" which indicates that the deterioration is not decided yet. Besides, the "total number of times of diagnoses" Jdgcnt is set at "0", and the "number of times of deterioration diagnoses" Detcnt is set at "0". Also, a "deterioration diagnosis grant flag" Fdetcnd is set at "0" which indicates that the deterioration analysis is not granted. Further, a "diagnosis grant timer" is set at "0".

At the step 1103, the CPU 103 decides whether or not the deterioration decision has already ended. In a case where the deterioration decision result flag Fcatdet is "0" indicating that the deterioration decision has not been rendered yet (YES), the routine proceeds to a step 1104. On the other hand, in a case where the deterioration decision result flag Fcatdet is "1" or "2" indicating that the deterioration decision has been ended (NO), the calculation routine is ended.

At the step 1104, the CPU 103 decides if the running is during the fuel cut or within the predetermined period since the release of the fuel cut state. When the condition holds, the routine proceeds to a step 1105, and when not, the routine proceeds to a step 1110. If the engine proper 1 is fed with fuel is detected by the fuel cut state detection means for detecting the fuel cut state. In a case where the engine proper 1 is not fed with the fuel, the running during the fuel cut is decided. Since lags are involved since the restart of the fuel feed till the arrives of the fuel at the catalyst 12 and the downstream-side $O_2$ sensor 15, the predetermined period since the release of the fuel cut state is also contained in the condition. The lags include a lag from the suction of the fuel into the internal combustion engine till the emission thereof, a movement lag within the exhaust pipe, etc. The "predetermined period" may be simply set as a predetermined period, or it may well be set in accordance with a running condition influential on the delays, for example, the suction air quantity or the revolution number.

At the step 1105, a "deterioration degree" CatOSA which is a calculation index for diagnosing the catalyst deterioration is reset to "0", and the routine thereafter proceeds to a step 1106. At the step 1106, the CPU 103 decides if the output V2 of the downstream-side $O_2$ sensor 15 is, at most, the predetermined voltage Xr1. In a case where the output V2 is, at most, the predetermined voltage Xr1 (YES), the routine proceeds to a step 1107, at which the diagnosis grant timer Tdet is incremented an updating cycle "Dtdet" as [Tdet=Tdet+Dtdet]. Here, "Dtdet" denotes a predetermined time, which is set at 5 [ms] being the updating cycle of the calculation routine. The predetermined voltage Xr1 is set at a voltage at which the air-fuel ratio in the downstream of the catalyst 12 becomes sufficiently lean with respect to the theoretical air-fuel ratio and which is, for example, 0.07 [V], on the basis of the output characteristic of the λ $O_2$ sensor employed as the downstream-side $O_2$ sensor 15 as shown in FIG. 2.

In a case where, as the result of the decision at the step 1106, it has been decided that the output V2 of the downstream-side $O_2$ sensor 15 exceeds the predetermined voltage Xr1 (NO), the routine proceeds to a step 1108 without executing the step 1107.

When the routine proceeds from the step 1106 or 1107 to the step 1108, the CPU 103 decides whether or not the diagnosis grant timer Tdet is, at least, a predetermined value Xdet. In a case where it has been decided at the step 1108 that the diagnosis grant timer Tdet is, at least, the predetermined value Xdet (YES), the routine proceeds to a step 1109 at which the diagnosis grant flag Fdetcnd is set at "1" and which is followed by a step 1120. In a case where it has been decided at the step 1108 that the diagnosis grant timer Tdet is less than the predetermined value Xdet (NO), the routine proceeds to the step 1120 without executing the step 1109.

The processing of the steps 1106 to 1109 renders the decision which grants the deterioration diagnosis only in a case where the oxygen storage quantity of the catalyst 12 is saturated to the upper limit value. Thus, the state of the oxygen storage quantity in the catalyst 12 before the start of the diagnosis is prevented from fluctuating every trial, and the precision of the diagnosis can be enhanced.

The oxygen storage quantity of the catalyst 12 sometimes fails to be saturated to the upper limit, depending upon the length of the fuel cut period, the value of the oxygen storage quantity in the catalyst 12 before the fuel cut, the size of an oxygen storage capacity changing due to the deterioration of the catalyst 12, or the like. However, when the air-fuel ratio on the downstream side of the catalyst 12 has become sufficiently lean likewise to the air-fuel ratio on the upstream side of the catalyst 12 during the fuel cut, the oxygen storage quantity of the catalyst 12 is saturated to the upper limit.

By way of example, in a case where a fuel cut time period is short, the quantity of oxygen storage in the catalyst 12 as is increased by the fuel cut is small, and the oxygen storage quantity sometimes fails to reach the upper limit. Besides, the catalyst of a new product has a large oxygen storage capacity, and the oxygen storage quantity sometimes fails to be saturated to the upper limit, even with the same increased quantity of the oxygen storage. Further, when the oxygen storage quantity in the catalyst 12 before the start of the fuel cut is small, the oxygen storage quantity sometimes fails to be saturated to the upper limit, even with the same increased quantity of the oxygen storage.

Besides, the deterioration diagnosis is granted subject to the decision at the step 1106 that the output V2 of the downstream-side $O_2$ sensor 15 is, at most, the predetermined voltage Xr1 and to the decision at the step 1108 that the diagnosis grant timer Tdet is, at least, the predetermined value Xdet. Thus, the diagnosis can be made only in a case where the oxygen storage quantity of the whole catalyst has been completely saturated to the upper limit. More specifically, the air-fuel ratio in the downstream of the catalyst becomes lean even in a case where the oxygen storage quantity of a partial exhaust gas flow path within the catalyst 12 has been saturated to the upper limit earlier than at the other part, on account of the nonuniform deterioration degree of the oxygen storage attributed to a thermal or temperature maldistribution or the like within the catalyst 12. However, when a predetermined time has lapsed, the oxygen storage quantity is saturated to the upper limit even at the other part, and hence, the diagnostic precision can be enhanced.

On the other hand, in the case where it has been decided at the step 1104 that the running is not during the fuel cut or within the predetermined time period since the release of the fuel cut state (NO), the routine proceeds to the step 1110, at which the diagnosis grant timer Tdet is reset to "0". Subsequently, the routine proceeds to a step 1111, at which the CPU 103 decides whether or not a diagnosis condition holds. In a case where the diagnosis condition does not hold (NO), the diagnosis grant flag Fdetcnd is reset to "0" at a step 1112, whereupon the diagnosis is suspended.

The diagnosis condition holds in a case where the first and second air-fuel ratio feedback controls are being executed. This is because the deterioration diagnosis is designed so as to be made on the premise of the executions of the air/fuel feedback controls. Besides, another example of the case where the diagnosis condition holds is a case where various learnt values reset by the detachment of the battery have been decided to be sufficiently re-learnt (for example, a case where a predetermined running time period has lapsed since the re-connection of the battery). More specifically, immediately after the various learnt values have been reset, the precisions of the air-fuel ratio controls are low, and the precision of the deterioration analysis degrades. Therefore, the diagnosis immediately after the resettings of the various learnt values is unsuitable.

Besides, when the running has become a predetermined running condition, the deterioration analysis may well be suspended. The predetermined running condition is, for example, a case where the abrupt acceleration or deceleration of a vehicle has occurred, or a case where the revolution number or load of the engine has fallen within a predetermined range. When the vehicle has been abruptly accelerated or decelerated, the disorder of the upstream-side air-fuel ratio becomes large, and the actual average air-fuel ratio deviates from the target average air-fuel ratio, so that the calculation precision of the oxygen storage quantity based on the target average air-fuel ratio as will be stated later degrades. Besides, even after the release of the fuel cut state, depending upon a running condition, it is sometimes necessary to set the gain of the second air-fuel ratio feedback control so as to suppress the worsening of the emission gas or to suppress the worsening of the drivability. In such a case, the precision of the deterioration diagnosis cannot be ensured, and hence, the deterioration analysis may well be suspended.

When it has been decided that the diagnosis condition does not hold (NO), as the result of the decision of the diagnosis condition at the step 1111, the routine proceeds to the step 1112. On the other hand, when it has been decided that the diagnosis condition holds (YES), as the result of the decision of the diagnosis condition at the step 1111, the routine proceeds to a step 1113, at which the CPU 103 decides whether or not the diagnosis is granted. In a case where, as the result of the decision, the diagnosis grant flag Fdetcnd is "1" indicating that the diagnosis is granted (YES), the routine proceeds to a step 1114 so as to calculate the deterioration degree CatOSA of the catalyst 12.

The deterioration degree CatOSA is that variation [g] of the catalyst oxygen storage quantity which occurs since the point of time of the release of the fuel cut state, till the point of time of the resetting of the output V2 of the upstream-side $O_2$ sensor 15 near to the target value. This deterioration degree CatOSA is calculated on the basis of the following formula (7) at the step 1114:

$$CatOSA = CatOSA + KO2 \times Qa \times \Delta A/F \times Dtdet \quad \text{Formula (7)}$$

Here, "KO2" denotes a predetermined coefficient for conversion into the oxygen storage quantity, "Qa" the suction air quantity [g/sec], "ΔA/F" the manipulation quantity of the average air-fuel ratio, and "Dtdet" a calculation cycle of 5 [ms].

Figure 13:
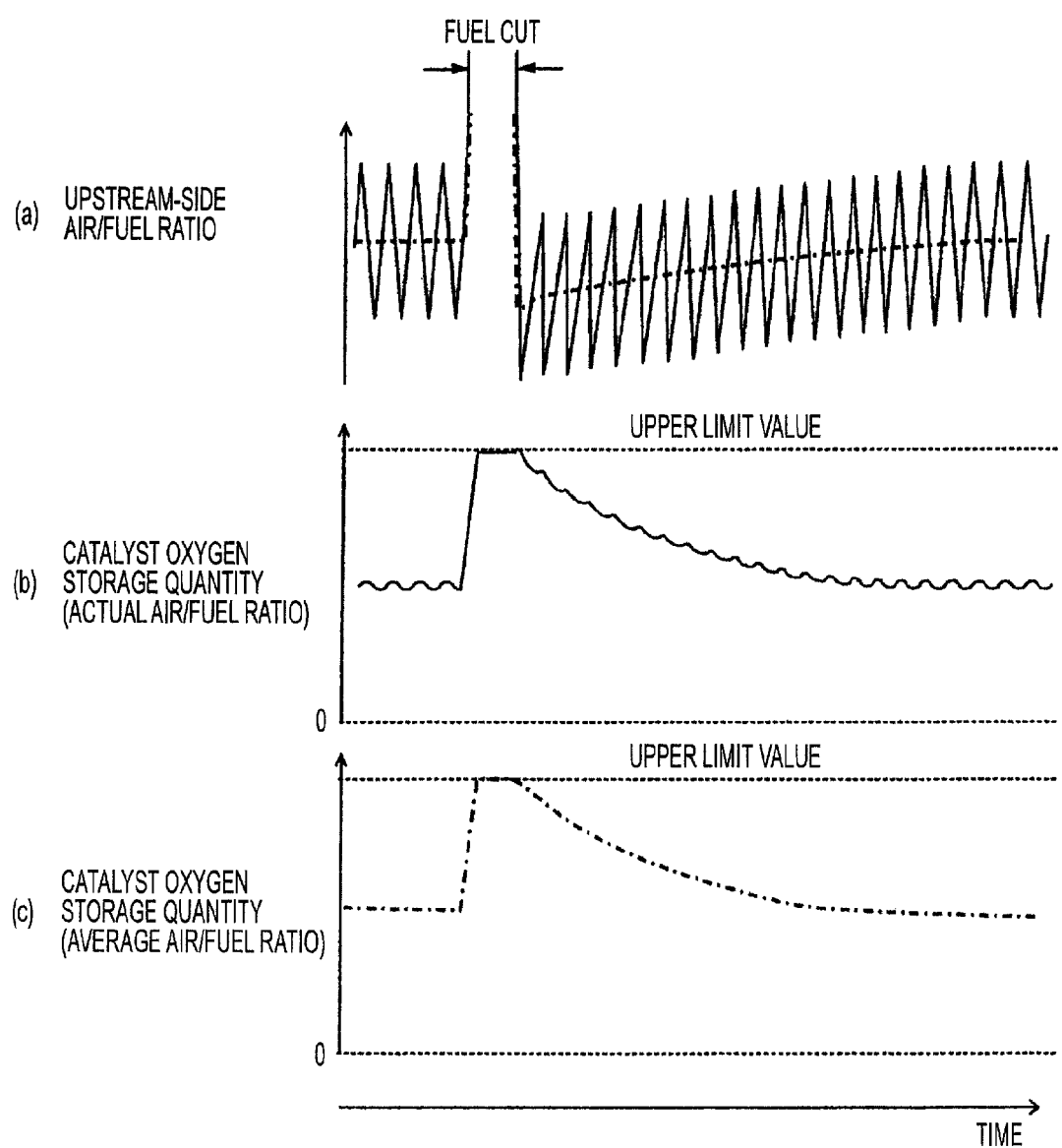
FIG. 13 is a timing chart for supplementarily explaining the flow chart of FIG. 12.

The manipulation quantity ΔA/F of the average air-fuel ratio is evaluated from the target average air-fuel ratio AFAVEobj. In FIG. 13, (a) is a graph showing the temporal change of the air-fuel ratio on the upstream side of the catalyst 12, (b) is a graph showing the temporal change of the oxygen storage quantity calculated from the actual air-fuel ratio after the release of the fuel cut state, and (c) is a graph showing the temporal change of the oxygen storage quantity calculated from the average air-fuel ratio. The graph of the oxygen storage quantity based on the average air-fuel ratio as shown in (c) of FIG. 13 does not represent the fluctuation component of high frequency in the oxygen storage quantity of the actual air-fuel ratio as shown in (b) of FIG. 13, but it can represent the whole resetting behavior of the oxygen storage quantity. This is because the integral value of air-fuel ratio oscillations becomes the oxygen storage quantity, so the average value thereof governs the whole behavior. As stated before, the target average air-fuel ratio AFAVEobj is designed so as to agree with the actual average air-fuel ratio favorably. Therefore, the precision is held even when the oxygen storage quantity is calculated with the target average air-fuel ratio AFAVEobj.

The manipulation quantity ΔA/F of the average air-fuel ratio is evaluated from the deviation between the target average air-fuel ratio AFAVEobj and a preset theoretical air-fuel ratio AF0, on the basis of the following formula (8):

$$\Delta A/F = AFAVEobj - AF0 \qquad \text{Formula (8)}$$

Here, as the theoretical air-fuel ratio AF0, a value set every running condition may well be employed, but the theoretical air-fuel ratio learnt by the second air-fuel ratio feedback control is employed in order to heighten the precision more. More specifically, as indicated by the following formula (9), the theoretical air-fuel ratio AF0 is evaluated by adding the integral calculation value to the initial value retained every running condition:

$$AF0 = AFAVE0 + AFI \qquad \text{Formula (9)}$$

In the absence of the forcible oscillation of the target average air-fuel ratio AFAVEobj, the manipulation quantity ΔA/F of the average air-fuel ratio becomes the same as the proportional calculation value AFP of the second air-fuel ratio feedback control. As indicated by the following formula (10), therefore, the manipulation quantity ΔA/F of the average air-fuel ratio can be set at the proportional calculation value AFP:

$$\Delta A/F = AFP \qquad \text{Formula (10)}$$

Owing to such a configuration, the calculation precision of the deterioration degree CatOSA can be prevented from degrading due to the fluctuation of the detection air-fuel ratio of the upstream-side $O_2$ sensor attributed to the secular change, etc.

Referring back to FIG. 12, the step 1114 is followed by a step 1115, at which the CPU 103 decides whether or not the output V2 of the downstream-side $O_2$ sensor 15 is, at least, the predetermined voltage Xrh. Subject to the decision that the output V2 is, at least, the predetermined voltage Xrh (YES), the routine proceeds to a step 1116, at which the deterioration analysis of the catalyst 12 is made. The predetermined voltage Xrh is set near the second target voltage VR2. When the output V2 of the downstream-side $O_2$ sensor 15 has been reset to near the target value after the release of the fuel cut state, it can be decided that the state where the oxygen storage quantity saturated to the upper limit by the fuel cut has been reset into the desirable purification state being about half of the upper limit.

Figure 14:
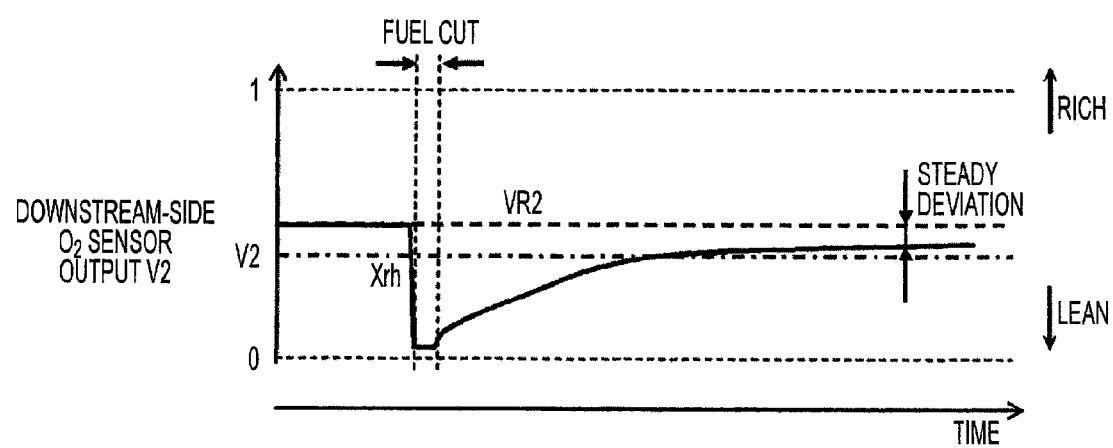
FIG. 14 is a timing chart for supplementarily explaining the flow chart of FIG. 12.

Besides, the predetermined voltage Xrh may well be set on the lean side with respect to the second target voltage VR2. The reason therefor is that, in a case where the output V2 of the downstream-side $O_2$ sensor 15 has undergone a steady deviation relative to the second target voltage VR2 as shown in FIG. 14, the decision of the resetting might lag to cause the error of the deterioration decision.

When the routine proceeds to the step 1116, the CPU 103 decides whether or not the absolute value of the deterioration degree CatOSA is, at most, a predetermined value Xcosa. Subject to the decision that the absolute value of the deterioration degree CatOSA is, at most, the predetermined value Xcosa (YES), the routine proceeds to a step 1117, at which the "number of times of deterioration diagnoses" Detcnt is incremented "1", thereby to indicate that the catalyst 12 has been diagnosed as being deteriorated. At the subsequent step 1118, the "total number of times of diagnoses" Jdgcnt is incremented "1", and at the subsequent step 1119, the diagnosis grant flag Fdetcnd is set at "0", whereupon the diagnosis is ended.

Figure 15A:
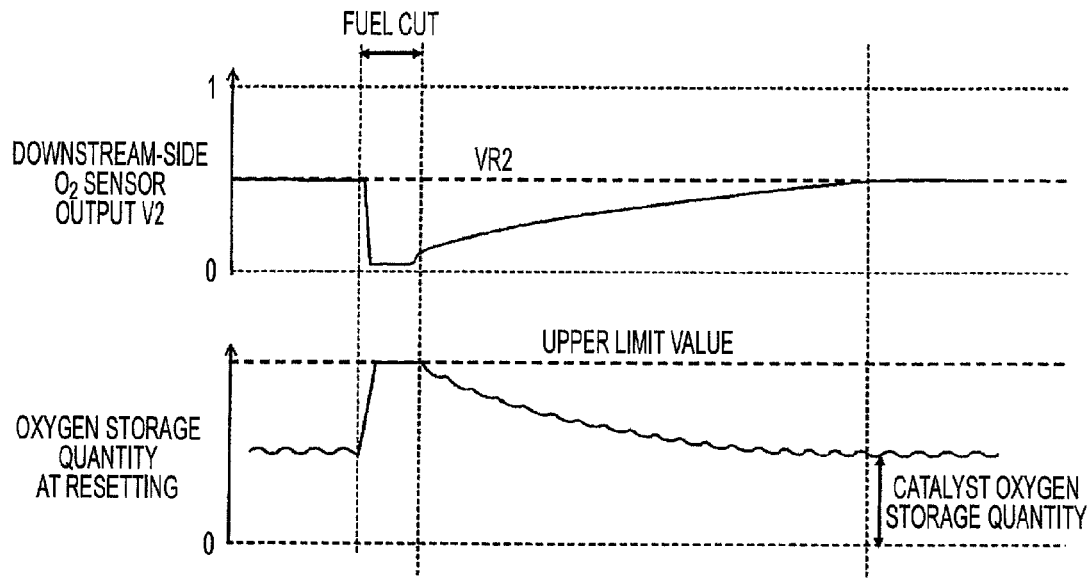
FIGS. 15A and 15B are timing charts for supplementarily explaining the flow chart of FIG. 12.
Figure 15B:
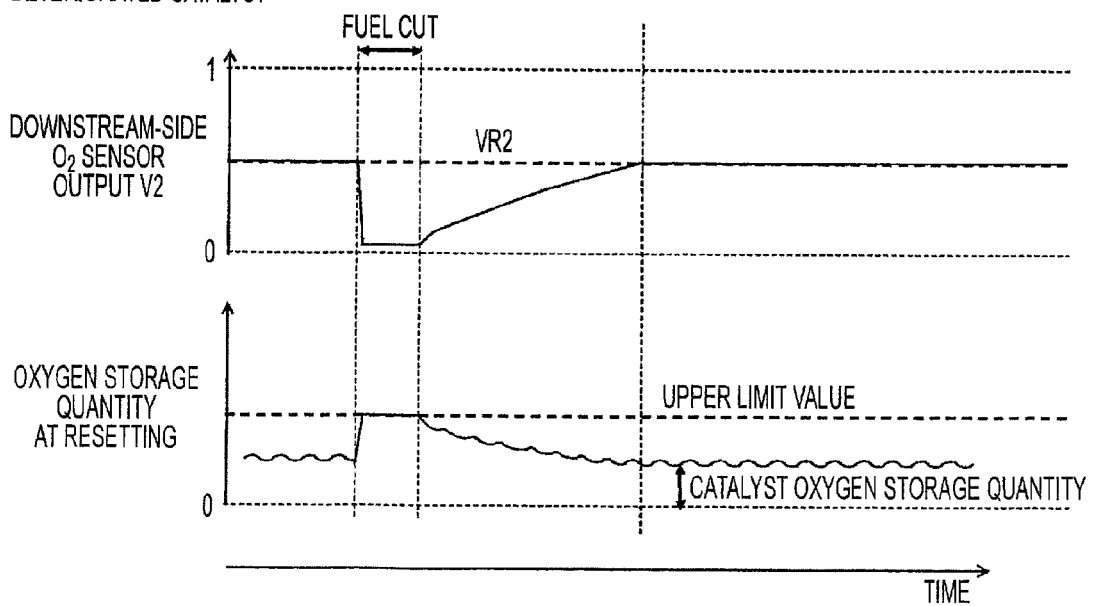

FIG. 15A is a graph showing the temporal change of the output V2 of the downstream-side $O_2$ sensor 15 in the case where the catalyst 12 is normal, while FIG. 15B is a graph showing the temporal change of the output V2 of the downstream-side $O_2$ sensor 15 in the case where the catalyst 12 has been deteriorated. As shown in FIG. 15B, when the upper limit value of the catalyst oxygen storage quantity decreases due to the deterioration of the catalyst 12, the oxygen storage quantity at the time when the output V2 of the downstream-side $O_2$ sensor 15 as becomes about the half of the upper limit value has been reset to near the second target voltage VR2 becomes smaller automatically as compared with the oxygen storage quantity in the case where the catalyst 12 is normal as shown in FIG. 15A. Therefore, the deterioration analysis can be made in terms of the magnitude of the deterioration degree CatOSA.

In a case where, as the result of the decision at the step 1115 in FIG. 12, it has been decided that the output V2 of the downstream-side $O_2$ sensor 15 is less than the predetermined voltage Xrh (NO), the control is not at a diagnosis timing, and hence, the routine proceeds to the step 1120.

At the step 1120, the CPU 103 decides whether or not the "total number of times of diagnoses" Jdgcnt is a "predetermined number of times" Xjdg. In a case where it has been decided at the step 1120 that the "total number of times of diagnoses" Jdgcnt is the "predetermined number of times" Xjdg (YES), the routine proceeds to a step 1121, and in a case where it has been decided that the "total number of times of diagnoses" Jdgcnt is not the "predetermined number of times" Xjdg (NO), the calculation routine is ended. At the step 1121, the CPU 103 decides whether or not the "number of times of deterioration diagnoses" Detcnt is, at least, the predetermined value Xdet. In a case where the condition of the decision holds (YES), the routine proceeds to a step 1122, at which the deterioration decision result flag Fcatdet indicating the decision of the catalyst 12 to have been deteriorated is set at "1".

In a case where the condition does not hold at the step 1121 (NO), the routine proceeds to a step 1123, at which the deterioration decision result flag Fcatdet indicating the decision of the catalyst 12 to be normal is set at "2", whereupon the calculation routine is ended. When the deterioration decision result flag Fcatdet is "1" indicating the decision of the deterioration of the catalyst 12, an alarm lamp is lit up, whereby a user is prompted to exchange the catalyst 12.

Next, there will be described the operation of the air-fuel ratio control apparatus for the internal combustion engine according to Embodiment 1 of this invention. FIG. 16 is graph showing the temporal changes of the various parameters in the case where an idle running continues since the release of the fuel cut state by employing the normal catalyst. Referring to FIG. 16, when the fuel cut stopping the fuel feed as shown in (a) of FIG. 16 is started at a time t151 at which the suction air quantity Qa shown in (c) of FIG. 16 is decreased by the deceleration of the vehicle, the upstream-side air-fuel ratio shown in (d) of FIG. 16 becomes lean sharply. Therefore, the oxygen storage quantity in the catalyst as shown in (e) of FIG. 16 increases abruptly and is saturated at the upper limit value.

When the oxygen storage quantity in the catalyst as shown in (e) of FIG. 16 is saturated at the upper limit value, the catalyst becomes incapable of absorbing the leaning fluctuation of the air-fuel ratio on the upstream side, and also the air-fuel ratio on the downstream side leans sharply, with the result that the output V2 of the downstream-side $O_2$ sensor 15 as shown in (f) of FIG. 16 exhibits a sharp lean state near 0 [V]. When the output V2 of the downstream-side $O_2$ sensor 15 as shown in (f) of FIG. 16 becomes lower than the predetermined value Xr1 at a time t152, the diagnosis grant timer Tdet shown in (g) of FIG. 16 begins to increase. When the diagnosis grant timer Tdet has exceeded the decision value Xtdet at a time t153, the diagnosis grant flag Fdetcnd shown in 8h) of FIG. 16 is set at "1" indicating the grant of the diagnosis.

The decision of the diagnosis grant is executed since the time t154 of the release of the fuel cut state, till a time t155 at which a predetermined time lapses. When the fuel cut state is released at the time t154, the first and second air-fuel ratio feedback controls are started. Here, the target average air-fuel ratio AFAVEobj on the upstream side as shown in (i) of FIG. 16 is calculated by the second air-fuel ratio feedback control.

Besides, owing to the first air-fuel ratio feedback control, while the air-fuel ratio of the upstream side as shown in (d) of FIG. 16 is cyclically oscillating in the rich direction and in the lean direction, the average value thereof comes into agreement with the target average air-fuel ratio AFAVEobj shown in (i) of FIG. 16. The target average air-fuel ratio AFAVEobj shown in (i) of FIG. 16 is calculated in accordance with the deviation between the output V2 of the downstream-side $O_2$ sensor 15 and the second target value VR2, and the deviation decreases gradually. The oxygen storage quantity of the catalyst 12 can be detected using the output V2 of the downstream-side $O_2$ sensor 15. When the output V2 has converged onto the second target value VR2, the catalyst oxygen storage quantity becomes about half of the upper limit value thereof as shown in (e) of FIG. 16.

When the deterioration analysis begins at the time t155, the calculation of the deterioration degree CatOSC which indicates the variation of the oxygen storage quantity after the release of the fuel cut state is started on the basis of the target average air-fuel ratio AFAVEobj and the suction air quantity Qa, as shown in (j) of FIG. 16. The calculation of the deterioration degree CatOSC is continued until the output V2 of the downstream-side $O_2$ sensor 15 arrives at the predetermined value Xrh set on the lean side with respect to the second target value VR2, at a time t156. On this occasion, the behavior of the deterioration degree CatOSC shown in (j) of FIG. 16 agrees favorably with the behavior of the oxygen storage quantity shown in (e) of FIG. 16 as has been calculated from the oscillating upstream-side air-fuel ratio, and the precision of the calculation is held.

Besides, when the absolute value of the deterioration degree CatOSA shown in (j) of FIG. 16 exceeds the decision value Xcosa at the time t156 being the deterioration diagnosis timing, the catalyst is decided as being normal, and the "total number of times of diagnoses" Jdgcnt shown in (1) of FIG. 16 is incremented "1" without increasing the "number of times of deterioration analyses" Detcnt shown in (l) of FIG. 16. Besides, when the "total number of times of diagnoses" Jdgcnt has agreed with the "predetermined number of times" Xjdg, the final deterioration decision is rendered at the time t156. Since, however, the "number of times of deterioration analyses" Detcnt shown in (k) of FIG. 16 is less than the predetermined value Xdet, the deterioration decision result Fcatdet shown in (m) of FIG. 16 is set at "2" indicating the normality.

Figure 17:
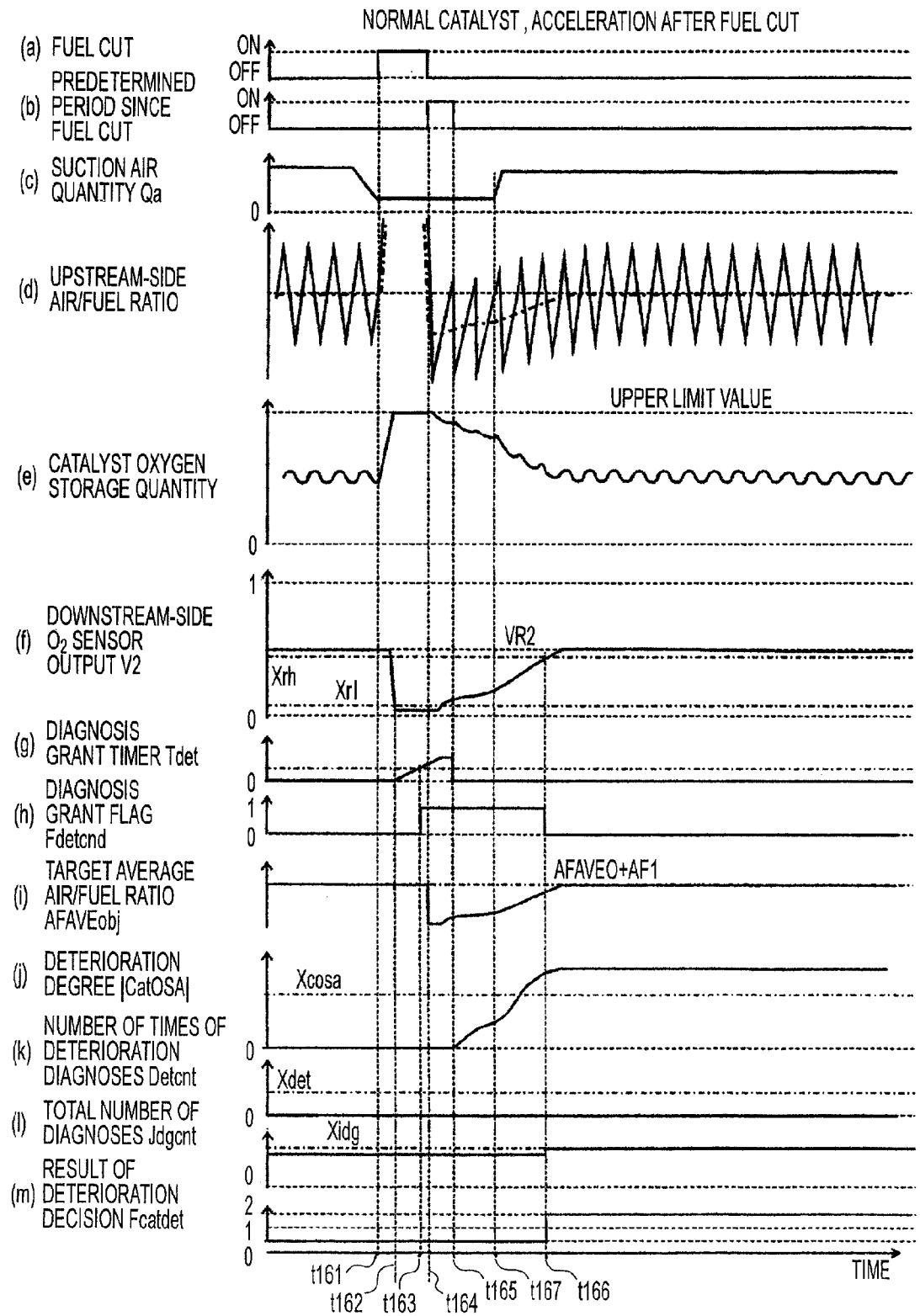
FIG. 17 is a timing chart for explaining the operation of the air-fuel ratio control apparatus according to Embodiment 1 of this invention.

Next, FIG. 17 is graph showing the temporal changes of the various parameters in the case where the vehicle has been accelerated during the deterioration analysis after the release of the fuel cut state by employing the normal catalyst. In this case, as compared with the case of FIG. 16, the suction air quantity Qa shown in (c) of FIG. 17 is increased by the acceleration of the vehicle at a time t167, and hence, the changing speed of the catalyst oxygen storage quantity as shown in (e) of FIG. 17 increases. Notwithstanding that the manipulation of the average air-fuel ratio of the upstream side based on the second air-fuel ratio feedback control is the same, the converging speed of the upstream-side air-fuel ratio shown in (d) of FIG. 17 increases, and the deterioration diagnosis ends at a time t166 which is earlier than in the case of FIG. 16.

The calculation value of the deterioration degree CatOSA shown in (j) of FIG. 17 changes in accordance with the change of the suction air quantity Qa shown in (c) of FIG. 17 and the change of the target air-fuel ratio, and the end time of the deterioration diagnosis becomes earlier. Nevertheless, the value of the deterioration degree CatOSA is substantially the same as in (j) of FIG. 16. It is understood that, when the deterioration decision is rendered simply on the basis of a time period as in the prior art, the precision of the deterioration analysis degrades in a case where the suction air quantity and the upstream-side average air-fuel ratio have changed.

In this manner, in accordance with the air-fuel ratio control apparatus for the internal combustion engine according to Embodiment 1, the deterioration decision is rendered on the basis of the upstream-side average air-fuel ratio and the suction air quantity which correlate with the behavior of the oxygen storage quantity of the catalyst. Accordingly, the apparatus according to Embodiment 1 has the advantage of enhancing the decision precision, as compared with the prior-art apparatus which renders the deterioration decision on the basis of the time period.

Figure 18:
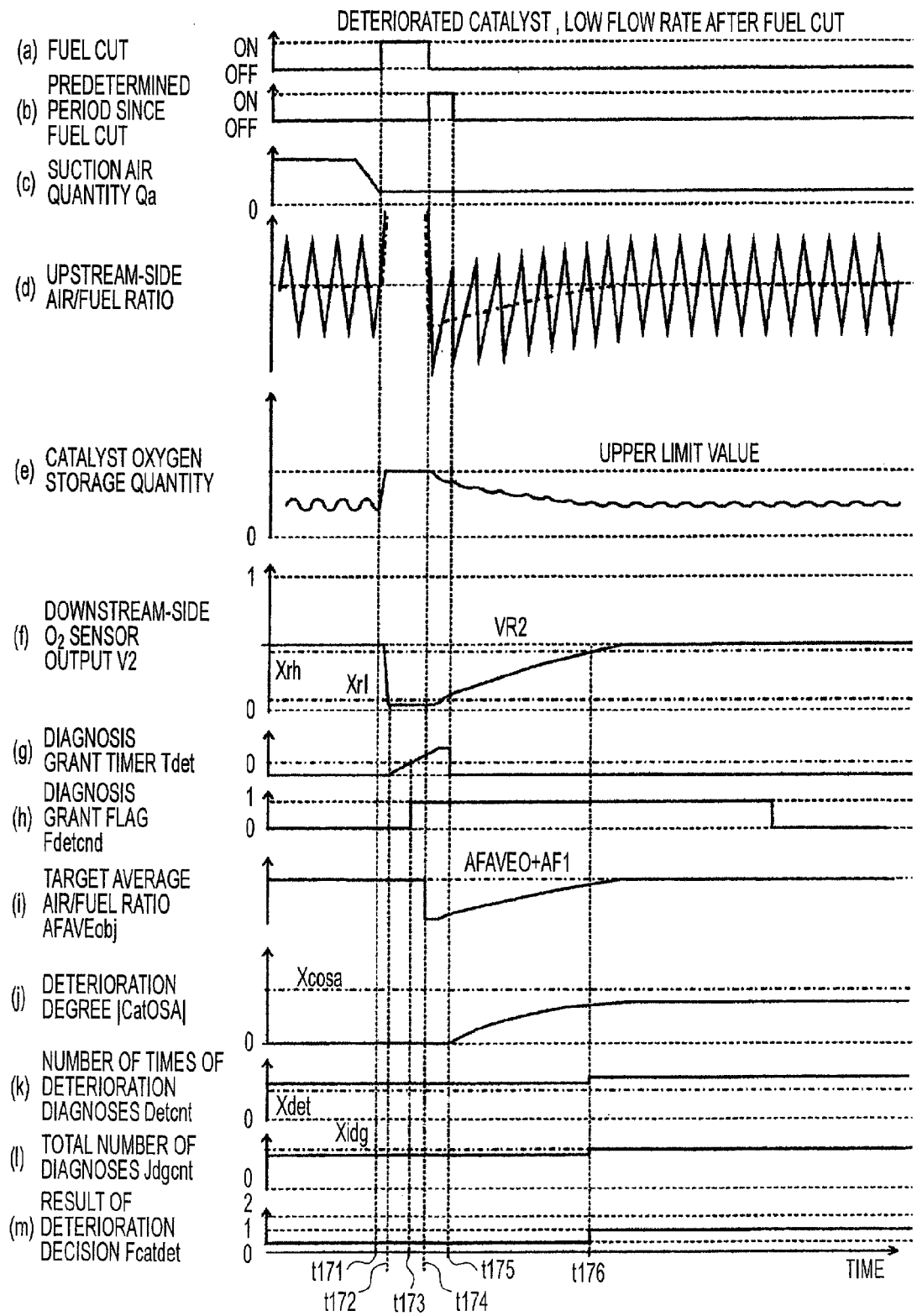
FIG. 18 is a timing chart for explaining the operation of the air-fuel ratio control apparatus according to Embodiment 1 of this invention.
Figure 19A:
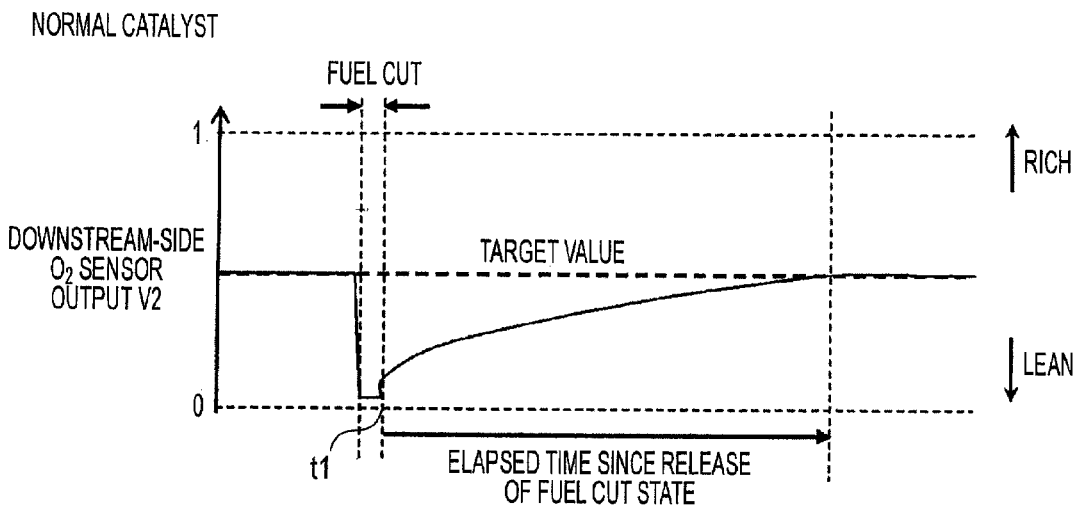
FIGS. 19A and 19B are timing charts for explaining the operation of a prior-art air-fuel ratio control apparatus.
Figure 19B:
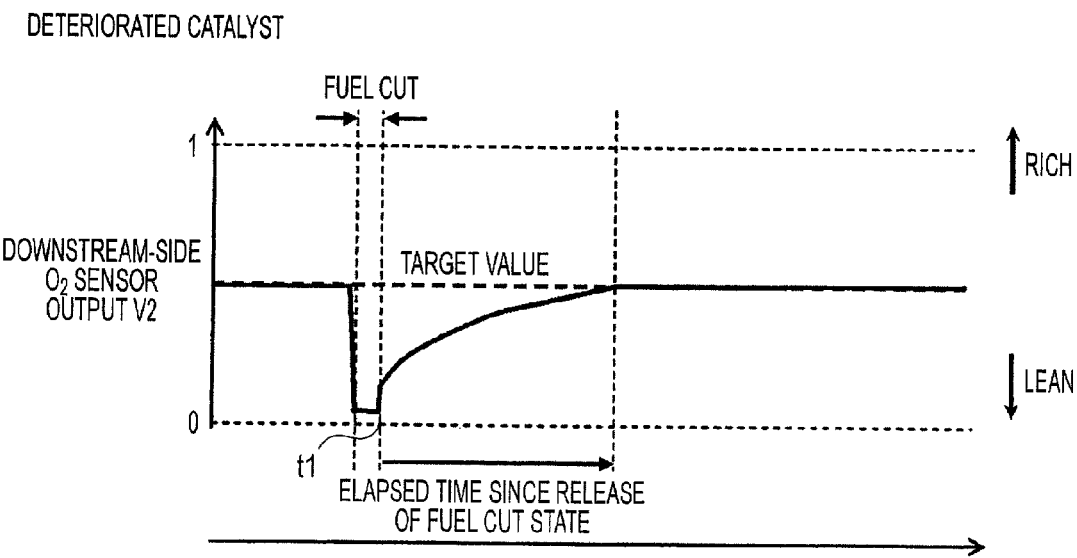

FIG. 18 is graph showing the temporal changes of the various parameters in the case where an idle running continues since the release of the fuel cut state by employing the deteriorated catalyst. In this case, the upper limit value of the catalyst oxygen storage quantity shown in (e) of FIG. 18 decreases to half of the corresponding value in the case of FIG. 16 or FIG. 17, on account of the deterioration of the catalyst. Since the upper limit value of the catalyst oxygen storage quantity has decreased to the half, the output V2 of the downstream-side $O_2$ sensor 15 as shown in (f) of FIG. 18 converges onto the second target value VR2, and the time period in which the catalyst oxygen storage quantity is reset to about the half of the upper limit value as shown in (e) of FIG. 18 shortens.

The deterioration analysis is ended at a time t176, and the value of the deterioration degree CatOSA shown in (j) of FIG. 18 has decreased to the half in proportion to the behavior of the oxygen storage quantity of the catalyst. Since the deterioration degree CatOSA is less than the predetermined value Xcosa as shown in (j) of FIG. 18, the catalyst is decided as having been deteriorated, and the "number of times of deterioration analyses" Detcnt is incremented "1" as shown in (k) of FIG. 18. Besides, since the "number of times of deterioration analyses" Detcnt shown in (k) of FIG. 18 exceeds the "predetermined number of times" Xdet, the "deterioration decision result" Fcatdet is set at "1" indicating the decision of the deterioration, as the result of the final deterioration decision shown in (m) of FIG. 18.

MODIFICATIONS TO EMBODIMENT 1

Next, modifications to Embodiment 1 will be described. In the air-fuel ratio control apparatus for the internal combustion engine according to Embodiment 1 as stated above, the downstream-side $O_2$ sensor 15 may well be replaced with a sensor which can detect a purification state in the upstream of the catalyst 12, for example, a linear air-fuel ratio sensor, a $NO_x$ sensor, an HC sensor or a CO sensor. Since such a sensor can also control the purification state of the catalyst, it has advantages similar to those of the $O_2$ sensor 15.

Besides, the upstream-side $O_2$ sensor 13 may well be a linear type $O_2$ sensor which has a linear output characteristic versus an air-fuel ratio change. Even with the linear type $O_2$ sensor, the average air-fuel ratio can be controlled while the air-fuel ratio on the upstream side is being oscillated, by the first air-fuel ratio feedback control. Therefore, advantages similar to those in the foregoing case of Embodiment 1 can be attained.

Besides, in the case where the linear type $O_2$ sensor is employed as the upstream-side $O_2$ sensor 13, a control of good follow-up to the target air-fuel ratio is also possible. Therefore, the air-fuel ratio on the upstream side is oscillated by cyclically oscillating the target air-fuel ratio in the rich direction and in the lean direction, and the average value of the target air-fuel ratio being oscillated is further oscillated cyclically in the rich direction and in the lean direction, whereby advantages similar to those in the foregoing case of Embodiment 1 can be attained.

Further, in Embodiment 1 stated before, the second air-fuel ratio feedback control apparatus is configured so as to calculate the target air-fuel ratio by employing the proportional calculation and the integral calculation, from the information items of the second target value VR2 and the output V2 of the downstream-side $O_2$ sensor 15. Even when the target air-fuel ratio is calculated from the second target value VR2 and the output V2 of the downstream-side $O_2$ sensor 15 by another feedback control, for example, the status feedback control, the sliding mode control, the observer, the adaptive control or the H ∞ control of a modern control theory, the purification state of the catalyst can be controlled, and hence, advantages similar to those in the foregoing case of Embodiment 1 can be attained.

Besides, Embodiment 1 stated before has had the configuration in which one catalyst 12 is mounted. In this regard, it is also allowed to arrange a plurality of catalysts in series or in parallel, and to employ $O_2$ sensors on the downstream sides of the respective catalysts, whereby the deteriorations of the plurality of catalysts located between the internal combustion engine and the downstream-side $O_2$ sensors can be diagnosed. Therefore, advantages similar to those in the foregoing case of Embodiment 1 can be attained. Besides, even when the downstream-side $O_2$ sensor which is used for the deterioration diagnoses is changed-over as the $O_2$ sensors located on the downstream sides of the respective catalysts, the deteriorations of the respective catalysts can be diagnosed, and hence, advantages similar to those stated before can be attained. Besides, in the case where the downstream-side $O_2$ sensor for the deterioration analyses is changed-over as the $O_2$ sensors located on the downstream sides of the respective catalysts, the deterioration decision value Xcosa is altered in accordance with the catalysts to-be-diagnosed, or the various parameters of the second air-fuel ratio feedback control is altered in accordance with the catalysts located between the internal combustion engine and the downstream-side $O_2$ sensor for use in the control. Thus, the precision of the catalyst deterioration analysis can be enhanced, the worsening of emission gas can be prevented, and advantages similar to those stated before can be attained.

The features of the air-fuel ratio control apparatus for the internal combustion engine according to this invention are listed as follows:

(1) The air-fuel ratio control apparatus for the internal combustion engine is characterized by including fuel cut state detection means for detecting a state of fuel cut in which feed of a fuel into the internal combustion engine is stopped; and catalyst deterioration decision means for deciding deterioration of the catalyst on the basis of a period which is expended since the fuel cut state detection means has detected release of the state of the fuel cut, until the output value of the second air-fuel ratio sensor agrees with a predetermined resetting decision value near the target value, and a manipulation quantity of the average air-fuel ratio of the upstream side as is based on the second air-fuel ratio feedback control means.

(2) The air-fuel ratio control apparatus for the internal combustion engine is characterized in that the catalyst deterioration decision means stated in item (1) decides the deterioration of the catalyst on the basis of a suction air quantity of the internal combustion engine as is imbibed since the fuel cut state detection means has detected the release of the state of the fuel cut, until the output value of the second air-fuel ratio sensor agrees with the predetermined resetting decision value near the target value, and the manipulation quantity of the average air-fuel ratio of the upstream side as is based on the second air-fuel ratio feedback control means.

(3) The air-fuel ratio control apparatus for the internal combustion engine is characterized in that the catalyst deterioration decision means stated in Item (1) calculates a variation of an oxygen storage quantity of the catalyst as is exhibited since the fuel cut state detection means has detected the release of the state of the fuel cut, until the output value of the second air-fuel ratio sensor agrees with the predetermined resetting decision value near the target value, on the basis of a suction air quantity of the internal combustion engine and the manipulation quantity of the average air-fuel ratio of the upstream side as is based on the second air-fuel ratio feedback control means, and that it decides the deterioration of the catalyst when the variation is smaller than a predetermined value.

(4) The air-fuel ratio control apparatus for the internal combustion engine is characterized in that the catalyst deterioration decision means stated in Item (1) decides the deterioration of the catalyst when the output value of the second air-fuel ratio sensor has become a leaner value than a predetermined "lean" decision value while the fuel cut state detection means is detecting the state of the fuel cut.

(5) The air-fuel ratio control apparatus for the internal combustion engine is characterized in that the catalyst deterioration decision means stated in Item (1) decides the deterioration of the catalyst when a period in which the output value of the second air-fuel ratio sensor has become a leaner value than a predetermined "lean" decision value while the fuel cut state detection means is detecting the state of the fuel cut has become, at least, a predetermined period.

(6) The air-fuel ratio control apparatus for the internal combustion engine is characterized in that the predetermined resetting decision value near the target value as is compared with the output value of the second air-fuel ratio sensor stated in Item (1) is set on a lean side with respect to the target value.

(7) The air-fuel ratio control apparatus for the internal combustion engine is characterized in that the second air-fuel ratio feedback control means stated in Item (1) manipulates the average air-fuel ratio of the upstream side with a proportional calculation and an integral calculation so that the output value of the second air-fuel ratio sensor and the target value may agree, and that the deterioration decision means decides the deterioration of the catalyst in accordance with the manipulation quantity of the average air-fuel ratio of the upstream side as is based on the proportional calculation.

(8) The air-fuel ratio control apparatus for the internal combustion engine is characterized in that a control gain of the second air-fuel ratio feedback control means is altered while the deterioration of the catalyst is being decided by the catalyst deterioration means stated in Item (1).

(9) The air-fuel ratio control apparatus for the internal combustion engine is characterized in that the second air-fuel ratio feedback control means stated in Item (1) manipulates the average air-fuel ratio of the upstream side with a proportional calculation and an integral calculation so that the output value of the second air-fuel ratio sensor and the target value may agree, and that a gain of the proportional calculation is altered while the deterioration of the catalyst is being decided by the catalyst deterioration decision means.

(10) The air-fuel ratio control apparatus for the internal combustion engine is characterized in that the second air-fuel ratio feedback control means stated in Item (1) manipulates the average air-fuel ratio of the upstream side with a proportional calculation and an integral calculation so that the output value of the second air-fuel ratio sensor and the target value may agree, and that the integral calculation is stopped while the deterioration of the catalyst is being decided by the catalyst deterioration decision means.

(11) The air-fuel ratio control apparatus for the internal combustion engine is characterized in that the catalyst deterioration decision means stated in Item (1) decides the deterioration of the catalyst, only in case of a predetermined running condition of the internal combustion engine.

(12) The air-fuel ratio control apparatus for the internal combustion engine is characterized in that the second air-fuel ratio feedback control means stated in Item (1) sets the target value of the average air-fuel ratio of the upstream side so that the output value of the second air-fuel ratio sensor and the target value may agree, and that the control constant is set in accordance with the target value of the average air-fuel ratio.

(13) The air-fuel ratio control apparatus for the internal combustion engine is characterized in that the control constant which is set in accordance with the target value of the average air-fuel ratio as stated in Item (1) includes at least two members selected from the group consisting of a delay time, a skip magnitude, an integral gain and a comparison voltage.

Various modifications and alterations of this invention will be apparent to those skilled in the art without departing from the scope and spirit of this invention, and it should be understood that this invention is not limited to the illustrative embodiments set forth herein.

What is claimed is:

1. An air-fuel ratio control apparatus for an internal combustion engine, having a catalyst which is disposed in an exhaust system of the internal combustion engine and which purifies exhaust gas from the internal combustion engine, a first air-fuel ratio sensor which is disposed on an upstream side of the catalyst and which detects an air-fuel ratio in upstream-side exhaust gas, a second air-fuel ratio sensor which is disposed on a downstream side of the catalyst and which detects an air-fuel ratio in downstream-side exhaust gas, first air-fuel ratio feedback control means for adjusting an air-fuel ratio to be fed into the internal combustion engine, in accordance with the output value of the first air-fuel ratio sensor and a predetermined control constant, and for oscillating the air-fuel ratio in the exhaust gas on the upstream side of the catalyst cyclically in a rich direction and in a lean direction, and second air-fuel ratio feedback control means for changing the control constant so that the output value of the second air-fuel ratio sensor and a target value may agree, and for manipulating an average air-fuel ratio obtained by averaging the air-fuel ratio in the upstream-side exhaust gas as is cyclically oscillated, comprising fuel cut state detection means for detecting a state of fuel cut in which feed of a fuel into the internal combustion engine is stopped; and catalyst deterioration decision means for deciding deterioration of the catalyst on the basis of a period which is expended since said fuel cut state detection means has detected release of the state of the fuel cut, until the output value of the second air-fuel ratio sensor agrees with a predetermined resetting decision value near the target value, and a manipulation quantity of the average air-fuel ratio of the upstream side as is based on the second air-fuel ratio feedback control means.

2. An air-fuel ratio control apparatus for an internal combustion engine as defined in claim 1, wherein said catalyst deterioration decision means decides the deterioration of the catalyst on the basis of a suction air quantity of the internal combustion engine as is imbibed since said fuel cut state detection means has detected the release of the state of the fuel cut, until the output value of the second air-fuel ratio sensor agrees with the predetermined resetting decision value near the target value, and the manipulation quantity of the average air-fuel ratio of the upstream side as is based on the second air-fuel ratio feedback control means.

3. An air-fuel ratio control apparatus for an internal combustion engine as defined in claim 1, wherein said catalyst deterioration decision means calculates a variation of an oxygen storage quantity of the catalyst as is exhibited since said fuel cut state detection means has detected the release of the state of the fuel cut, until the output value of the second air-fuel ratio sensor agrees with the predetermined resetting decision value near the target value, on the basis of a suction air quantity of the internal combustion engine and the manipulation quantity of the average air-fuel ratio of the upstream side as is based on the second air-fuel ratio feedback control means, and it decides the deterioration of the catalyst when the variation is smaller than a predetermined value.

4. An air-fuel ratio control apparatus for an internal combustion engine as defined in claim 1, wherein said catalyst deterioration decision means decides the deterioration of the catalyst when the output value of the second air-fuel ratio sensor has become a leaner value than a predetermined "lean" decision value while said fuel cut state detection means is detecting the state of the fuel cut.

5. An air-fuel ratio control apparatus for an internal combustion engine as defined in claim 1, wherein said catalyst deterioration decision means decides the deterioration of the catalyst when a period in which the output value of the second air-fuel ratio sensor has become a leaner value than a predetermined "lean" decision value while said fuel cut state detection means is detecting the state of the fuel cut has become, at least, a predetermined period.

6. An air-fuel ratio control apparatus for an internal combustion engine as defined in claim 1, wherein the predetermined resetting decision value near the target value as is compared with the output value of the second air-fuel ratio sensor is set on a lean side with respect to the target value.

7. An air-fuel ratio control apparatus for an internal combustion engine as defined in claim 1, wherein the second air-fuel ratio feedback control means manipulates the average air-fuel ratio of the upstream side with a proportional calculation and an integral calculation so that the output value of the second air-fuel ratio sensor and the target value may agree, and said deterioration decision means decides the deterioration of the catalyst in accordance with the manipulation quantity of the average air-fuel ratio of the upstream side as is based on the proportional calculation.

8. An air-fuel ratio control apparatus for an internal combustion engine as defined in claim 1, wherein a control gain of the second air-fuel ratio feedback control means is altered while the deterioration of the catalyst is being decided by said catalyst deterioration means.

9. An air-fuel ratio control apparatus for an internal combustion engine as defined in claim 1, wherein the second air-fuel ratio feedback control means manipulates the average air-fuel ratio of the upstream side with a proportional calculation and an integral calculation so that the output value of the second air-fuel ratio sensor and the target value may agree, and a gain of the proportional calculation is altered while the deterioration of the catalyst is being decided by said catalyst deterioration decision means.

10. An air-fuel ratio control apparatus for an internal combustion engine as defined in claim 1, wherein the second air-fuel ratio feedback control means manipulates the average air-fuel ratio of the upstream side with a proportional calculation and an integral calculation so that the output value of the second air-fuel ratio sensor and the target value may agree, and the integral calculation is stopped while the deterioration of the catalyst is being decided by said catalyst deterioration decision means.

11. An air-fuel ratio control apparatus for an internal combustion engine as defined in claim 1, wherein said catalyst deterioration decision means decides the deterioration of the catalyst, only in case of a predetermined running condition of the internal combustion engine.

12. An air-fuel ratio control apparatus for an internal combustion engine as defined in claim 1, wherein the second air-fuel ratio feedback control means sets the target value of the average air-fuel ratio of the upstream side so that the output value of the second air-fuel ratio sensor and the target value may agree, and the control constant is set in accordance with the target value of the average air-fuel ratio.

13. An air-fuel ratio control apparatus for an internal combustion engine as defined in claim 1, wherein the control constant which is set in accordance with the target value of the average air-fuel ratio includes at least two members selected from the group consisting of a delay time, a skip magnitude, an integral gain and a comparison voltage.

* * * * *